United States Patent
Kim et al.

(10) Patent No.: US 10,212,052 B2
(45) Date of Patent: *Feb. 19, 2019

(54) METHOD FOR PROVIDING CONTENTS IN A MOBILE COMMUNICATION SYSTEM AND APPARATUS THEREOF

(71) Applicant: SK PLANET CO., LTD., Seongnam-si, Gyeonggi-do (KR)

(72) Inventors: Yon-Hee Kim, Seoul (KR); Tae-Ho Oh, Seoul (KR); Young In Cha, Seoul (KR); Gi-Seon Nam, Seongnam-si (KR); O-Hyon Kwon, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,667

(22) Filed: Aug. 22, 2016

(65) Prior Publication Data

US 2016/0373316 A1   Dec. 22, 2016

Related U.S. Application Data

(63) Continuation of application No. 11/573,865, filed as application No. PCT/KR2005/002726 on Aug. 18, 2005, now Pat. No. 9,426,651.

(30) Foreign Application Priority Data

Aug. 18, 2004 (KR) .................. 10-2004-0065111
Aug. 19, 2004 (KR) .................. 10-2004-0065483
(Continued)

(51) Int. Cl.
*H04L 12/24* (2006.01)
*H04W 8/18* (2009.01)
(Continued)

(52) U.S. Cl.
CPC .......... *H04L 41/5045* (2013.01); *H04L 63/08* (2013.01); *H04L 63/104* (2013.01);
(Continued)

(58) Field of Classification Search
CPC ... H04L 41/5045; H04L 63/104; H04L 67/06; H04L 67/04; H04L 63/08; H04W 8/18;
(Continued)

(56) References Cited

U.S. PATENT DOCUMENTS

2002/0057678 A1   5/2002   Jiang et al.
2002/0078085 A1*  6/2002   Kikuchi .......... G06F 17/30902
                                                      715/205
(Continued)

FOREIGN PATENT DOCUMENTS

JP   2002-259396 A   9/2002
JP   2002-342659 A   11/2002
(Continued)

*Primary Examiner* — Ajit Patel
(74) *Attorney, Agent, or Firm* — Brinks Gilson & Lione

(57) ABSTRACT

A method for providing contents in a mobile communication system, the method comprising searching subscriber information of client information of the mobile terminal connected with a wireless internet, performing an authentication of the subscriber information, transmitting an inquiry message as to whether to be affiliated with a wireless internet to the mobile terminal in the case that a subscriber has a due right but didn't register to a wireless internet in the authenticating result, and automatically affiliating with a wireless internet in the case that a terminal of the subscriber receives an agreement message of an affiliation with a wireless internet. The automatically affiliating with a wireless internet comprising generating a predetermined provisional data for affiliating except for the subscriber information and
(Continued)

apparatus information of the subscriber terminal of data requested in case of being affiliated with the wireless internet.

20 Claims, 27 Drawing Sheets

(30) Foreign Application Priority Data

| | | | |
|---|---|---|---|
| Aug. 20, 2004 | (KR) | ........................ | 10-2004-0065844 |
| Aug. 24, 2004 | (KR) | ........................ | 10-2004-0066909 |
| Sep. 23, 2004 | (KR) | ........................ | 10-2004-0076299 |
| Oct. 28, 2004 | (KR) | ........................ | 10-2004-0086521 |

(51) Int. Cl.

| | |
|---|---|
| *H04L 29/06* | (2006.01) |
| *H04W 12/06* | (2009.01) |
| *H04L 29/08* | (2006.01) |
| *H04M 1/725* | (2006.01) |
| *H04W 4/00* | (2018.01) |
| *H04W 74/00* | (2009.01) |
| *H04M 15/00* | (2006.01) |
| *H04W 48/18* | (2009.01) |

(52) U.S. Cl.
CPC .............. *H04L 67/04* (2013.01); *H04L 67/06* (2013.01); *H04M 1/72583* (2013.01); *H04W 8/18* (2013.01); *H04W 12/06* (2013.01); *H04M 15/844* (2013.01); *H04W 4/00* (2013.01); *H04W 48/18* (2013.01); *H04W 74/00* (2013.01)

(58) Field of Classification Search
CPC ....... H04W 12/06; H04W 48/18; H04W 4/00; H04W 74/00; H04M 1/72583; H04M 15/844
See application file for complete search history.

(56) References Cited

U.S. PATENT DOCUMENTS

| | | | |
|---|---|---|---|
| 2002/0123335 A1* | 9/2002 | Luna | H04L 29/06 455/419 |
| 2002/0184610 A1 | 12/2002 | Chong et al. | |
| 2002/0191795 A1 | 12/2002 | Wills | |
| 2003/0090998 A1* | 5/2003 | Lee | H04L 63/0272 370/229 |
| 2003/0120593 A1 | 6/2003 | Bansal et al. | |
| 2003/0139174 A1* | 7/2003 | Rao | H04L 29/06 455/418 |
| 2003/0156591 A1* | 8/2003 | Sorsa | H04L 67/42 370/401 |
| 2003/0228842 A1* | 12/2003 | Heinonen | H04L 63/083 455/41.2 |
| 2003/0233329 A1* | 12/2003 | Laraki | G06Q 20/123 705/52 |
| 2004/0049589 A1* | 3/2004 | Papanikolaou | G06F 17/30873 709/229 |
| 2004/0098609 A1 | 5/2004 | Bracewell et al. | |
| 2004/0176067 A1 | 9/2004 | Lakhani et al. | |
| 2004/0214572 A1 | 10/2004 | Thompson et al. | |
| 2005/0210249 A1 | 9/2005 | Lee et al. | |
| 2006/0053090 A1 | 3/2006 | Cotter et al. | |
| 2006/0080539 A1* | 4/2006 | Asami | G06F 21/34 713/182 |
| 2006/0129816 A1 | 6/2006 | Hinton | |
| 2007/0088837 A1 | 4/2007 | Gidron et al. | |

FOREIGN PATENT DOCUMENTS

| | | |
|---|---|---|
| KR | 1020000059081 A | 10/2000 |
| KR | 1020020018986 A | 3/2002 |
| KR | 1020020079133 A | 10/2002 |
| KR | 1020030030586 A | 4/2003 |
| KR | 1020030039844 A | 5/2003 |
| KR | 1020040060018 A | 7/2004 |
| WO | 02/067167 | 8/2002 |

* cited by examiner

FIG. 7

| | CONTENT MANAGEMENT |
|---|---|
| ⊟ | CONTENT & HANDSET URI COMBINATION MANAGEMENT |
| • | CONTENT & HANDSET URI COMBINATION |
| • | COMBINE SERVICE & PHONE TYPE |
| ⊟ | MENU OPERATION TEAM MGMT |

● CONTENT & HANDSET URI COMBINATION

— TOTAL NUMBER OF SEARCH RESULT : 4       PAGE NUMBER(S) 1 OF 1

| NO | CONTENT & HANDSET URI COMBINATION ID | CONTENT & HANDSET URI COMBINATION ID | ASSOCIATED HANDSET URI | ASSOCIATED CP MANAGEMENT | |
|---|---|---|---|---|---|
| 1 | 1 | WAP | HTTP://WWW.SKREPOSITORY/XXX.RDF | WAP-SIMPLE | MODIFY DELETE |
| 2 | 2 | TESTING | HTTP://WWW.SKREPOSITORY/XXX.RDF | DOWNLOAD-SIMPLE | MODIFY DELETE |
| 3 | 3 | SSSSSS | HTTP://WWW.SKREPOSITORY/XXX.RDF | DOWNLOAD-SIMPLE | MODIFY DELETE |
| 4 | 4 | SSSSSSSDSF | | WAP-SIMPLE | MODIFY DELETE |

METHOD FOR PROVIDING CONTENTS IN A MOBILE COMMUNICATION SYSTEM AND APPARATUS THEREOF

CROSS REFERENCE TO RELATED APPLICATION

The present application is a continuation of the U.S. patent application Ser. No. 11/573,865, filed on Nov. 13, 2007, which is a U.S. National Phase Entry of International Patent Application No. PCT/KR2005/002726 filed Aug. 18, 2015, which is based upon and claims the benefit of priority to Korean Patent Application No. 10-2004-0065111, filed on Aug. 18, 2004 and No. 10-2004-0065483, filed on Aug. 19, 2004 and No. 10-2004-0065844, filed on Aug. 20, 2004 and No. 10-2004-0066909, filed on Aug. 24, 2004 and No. 10-2004-0076299, filed on Sep. 23, 2004 and No. 10-2004-0086521, filed on Oct. 28, 2004 in the KIPO (Korean Intellectual Property Office). The disclosures of the above-listed applications are hereby incorporated by reference herein in their entirety.

TECHNICAL FIELD

The present invention relates to a mobile communication system, and more particularly to a method for providing contents in a mobile communication system and apparatus thereof that a mobile communication system operator provides a subscriber terminal with a data service using contents provided by contents provider.

BACKGROUND ART

In recent, owing to develop of a mobile terminal, the mobile terminal is not a mean for providing a voice communication any more. Particularly, a wireless terminal having a WAP (Wireless Application Protocol) function actively accesses a gateway for accessing information a user wishes to use. The user can obtain important information such as a flight time, bell sound, a game and a real-time stock market price, etc through the wireless terminal having a WAP.

A mobile network operator has to satisfy an individual request of a content provider for providing a service subscriber and a wireless terminal of the service subscriber or a wire terminal with contents in order to correspond to various service request mentioned above.

For the satisfaction of an individual request of a content provider, the mobile network operator has to provide a service subscriber of a wireless terminal with a client personalization service, an intuitional and an accessible user interface, an authenticity, of security, convenient access, fast access to contents and a use of qualitative time.

Also the mobile network operator has to provide a content provider with a platform that drafts the regulation, can be expanded, satisfies requirements of a present content provider and applies on a progressive business and a technical circumstance rapidly and effectively.

In addition, because a conventional wireless internet service method and/or system thereof enable respective dispersed individual servers to provide a separate service, an individual contents provider can provide a subscriber with special and individuated contents.

But there has been a problem that a wireless communication operator, who shares the individual contents providers with a communication network and information of subscribers affiliated with the communication network, has to individually manage individuated contents providers.

At this time, a tool, with which a plurality of contents providers can conveniently provide contents service, is need. And also a one-stop management of a plurality of contents providers individually managed and their service provision is strongly requested.

In addition, a mobile terminal is used for an information acquisition, an internet search and a game, etc. This is the reason why various wireless internet connection functions are added, and most of various contents, which mobile communication operators or contents providers joining hand with them provide, are provided through a wireless internet based on wireless application protocol.

But because most of a terminal used for a wireless internet is mainly manufactured as a voice communication at this point, the terminal has been miniaturized and light-weighed. Accordingly, because a size of screen is minimized, the number of selection items included in each menu is fewer and a depth of total menu is deeply designed.

Therefore, because only a low menu of an identical layer is displayed on a screen, selection of a specific low menu and movement to a desired menu is easy, however, a user has to repeatedly select a menu key or a short key and thus move to a high menu in order to move to a specific high menu.

In addition, there has been a problem that because WAP menus displayed on a screen of a mobile terminal have a user interface based on a text and thus all users are provided with a menu having an identical form, the form is monotonous and thus it is difficult of all user to easily sensitively realize a content of menus.

Because a terminal using a wireless internet has much various functions at this point, it is difficult to provide a service so as to fit for a function of any one terminal.

As an example, there is a problem that a form of a menu is monotonous and it is difficult of all users to easily sensitively realize a content of menus in case of providing all users with a WAP menu displayed on a screen of a mobile terminal in accordance with a function of an old-versioned terminal as a menu form generated based on a text.

In addition, there has been generated a problem that a menu generated by old-versioned terminal supporting only a browser for a text in case of generating a menu using a view type of various layouts and items so as to fit for a function of a terminal providing multimedia contents.

In general, an internet mainly uses a connection method through a wire (cable). A use of a wire internet is performed on an open network without paying. Exceptionally in case of using a pay contents, a fee is paid through an identification of ID on a wire internet.

In case of an internet communication using a wire, HTTP (Hyper Text Transfer Protocol) performs a communication between an internet server and a client by using a fixed network cable, and provides a fixed IP (Internet Protocol; referred to as IP hereinafter) address. Accordingly, after the internet server realizes an IP of a user who wishes to access the internet server and use an internet contents service and then performs an authentication process identifying a user name and password, etc, the internet server maintains a communication with the user by using a method such as a session and a cookie, etc.

The cookie is a provisional file including information generated in the case that a client accesses a predetermined homepage, and a size of the cookie is less than 4 Kb.

Originally, the cookie is generated for helping a homepage connection of internet users. If a user visits a predetermined site initially, a cookie registering an ID and a password is generated. If the user will visit the predetermined site next time, the user rapidly accesses the predetermined site through the cookie. The cookie can be generated and renewed by a web browser connected with an internet, and transfers a record thereof to a contents providing unit.

But a mobile terminal connected with a wireless internet has a storage capability and thus cannot connect with a wireless internet. And in case of providing a contents provider or an external server with a mobile terminal connected with a portal platform for integrating and managing a wire internet or a wireless internet, an encryption for preventing from a release of client information is devoutly requested.

At last, in case of being affiliated with a wireless internet like an affiliation of a wire internet, a predetermined affiliation process has to be performed. Namely, there are many data inputs requested in the case that a subscriber visits a terminal agent or registers a subscriber s name, an address, an social security number, a business registry number, a desired ID and a secret number in accordance with the ID by accessing a wireless internet.

Furthermore, a data input is difficult because a screen and a keypad of a mobile terminal are miniaturized. Additionally speaking, there is a problem that a user has to perform a sticky affiliation process in the case that the user, who uses a mobile terminal having a WAP function but isn't affiliated with a wireless internet, wishes to use an wireless internet.

DISCLOSURE

Technical Problem

Accordingly, it is an object of the present invention to provide a mobile communication system including a method for providing contents in a mobile communication system and apparatus thereof enabling a mobile communication system operator to perform a one-stop management to a contents provider, and moreover enabling the contents provider to conveniently provide a service with the mobile terminal.

Technical Solution

It is a first aspect of the present invention to provide an apparatus for providing contents in a mobile communication system, the apparatus comprising: a contents provider access unit for responding to an inquiry request related to a service provision using contents providing terminal connected through a communication network and managing a rule related to the contents providing terminal and a connection and an inquiry request of the contents providing terminal; a central management unit for managing a predetermined service, a subscriber affiliated with the service, apparatus information of a subscriber terminal and an operation and an authentication of the service based on a data inputted from a contents providing terminal connected through the contents provider access unit; a transmission unit for receiving terminal information of a subscriber affiliated with the service and transmitting a menu of the service and contents in accordance with an apparatus of many piece of the terminal information of a subscriber affiliated with the service; and an interface unit for performing an interface with an external server interlocked with the service, providing the service and the contents and managing a rule to the external server.

The contents provider access unit provides an authentication of the connected contents providing terminal, and the authenticated contents providing terminal and a connection interface for communicating in accordance with the rule.

The transmission unit comprises: a transmission management unit for obtaining client information of the subscriber terminal and authenticating the same, and extracting apparatus information of many piece of the client information and providing the central management unit with the same; and a transmission channel unit for providing the authenticated subscriber terminal with the service menu generated in accordance with the apparatus information and contents.

The transmission management unit comprises: a connection detection module for detecting apparatus information and subscriber information of the mobile terminal connected with a wireless internet; a basic information collection module for checking a kind of the service and a menu in accordance with the kind of the service; and a rendering module for filtering a menu in accordance with the apparatus information of the menus and then transmitting the filtered menu to the mobile terminal.

The transmission management unit further comprises an authentication module for deciding an authentication based on the client information, and storing the client information during a predetermined time in the case that the authentication is completed.

The authentication module omits an authentication of the client information in the case that the client information is stored at a predetermined memory.

The client information is stored at the predetermined memory during a predetermined time.

The subscriber information is any one of an MIN (Mobile identification Number), an MDN (Mobile Directory Number) and client information, and the apparatus information is a phone type or a URI (Unique Resource Identity).

The transmission management unit further comprises an encryption module for converting the subscriber information and the apparatus information into a predetermined in the case that the subscriber information and the apparatus information is not a formation defined in an OMA (Open Mobile Alliance) standard.

The predetermined code is generated using a plug-in method.

The transmission management unit provides a history menu of the subscriber terminal by storing a menu selected by the subscriber terminal.

The transmission channel unit comprises a wireless subscriber channel for providing the subscriber terminal and an interface through a wireless network.

The transmission channel unit further comprises a wire subscriber channel for providing the subscriber terminal and an interface through a wire network.

The transmission channel unit further comprises an automatic authentication unit for generating a predetermined cookie based on apparatus information of client information of a subscriber terminal connected through a wireless network and performing a user agent processing for protecting the client information.

The central management unit further comprises a subscriber management unit for automatically getting a subscriber terminal registered to a wireless internet by enabling a subscriber terminal to receive a wireless internet registration request in the case that a subscriber is affiliated with a wire communication network or a wireless communication network by searching registered subscriber service in accordance with a inquiry message transmitted from the authentication module.

The subscriber management unit, a predetermined provisional data fills a data for affiliating except for the subscriber information and an apparatus information of the subscriber terminal of data requested in case of being affiliated with the wireless internet.

The central management unit further comprises: an apparatus information management unit for generating terminal group information by classifying an apparatus information of the mobile terminal in accordance with a predetermined rule; and a service management unit for connecting contents-apparatus information with a menu item and storing the same in case of generating a menu of a wireless internet to be provided with the mobile terminal by connecting contents with corresponding terminal group information and generating the contents-apparatus information when contents to be provided with the mobile terminal is stored.

The service management unit further comprises: a segment management module for managing a segment for providing contents with the mobile terminal in accordance with a predetermined rule by an operator and adjusting a layout of a menu in the segment; a menu management module for adjusting a browser type of the mobile terminal and a view type of the menu item; and a rendering module, wherein the rendering module transmits a menu in accordance with the apparatus information to the mobile terminal by enabling the mobile terminal to receive a menu corresponding to the segment and to receive apparatus information from the apparatus information management unit.

The rendering unit stores a predetermined program for displaying respective items of the menu as any one of a text type, an index type, an index under bar type and a pictogram type in accordance with the apparatus information.

The central management unit further comprises a search engine, wherein the search engine generates a WAP page for the mobile terminal provided for checking the service or contents using the mobile terminal and transmits the WAP page to the mobile terminal through the transmission unit.

The search engine stores a predetermined code in accordance with the WAP page, and transmits the WAP page in accordance with the code to the mobile terminal in the case that the predetermined code is inputted from the mobile terminal.

The central management unit does a grouping a service in accordance with a kind of service by a request of the contents provider and manages the same.

The central management unit further comprises at least one of contents providing terminal for doing a grouping the service and registering the same in accordance with a kind of the service, storing and managing contents in accordance with the service and providing the contents in accordance with a request of a subscriber terminal affiliated with the service.

A predetermined plug-in is provided to the contents providing terminal in the case that the contents providing terminal is connected.

The interface unit comprises: an interface connection unit for directly being connected with an external server by having a protocol in accordance with the external server and transmitting and receiving a predetermined data; and an interface management for managing a configuration of the external server.

The interface unit for periodically providing a billing server which is the external server with a billing data by storing and managing the billing data according to providing a short message in accordance with the service rule in the case that the interface unit services the short message by being connected with a short message service server.

The interface unit for periodically providing a billing server with a billing data by storing and managing the billing data according to providing a predetermined service or contents generated in accordance with the service rule in the case that the interface unit provides the predetermined service or the contents in accordance with a service provision request of the authenticated subscriber terminal.

It is a second aspect of the present invention to provide an apparatus for providing contents in a mobile communication system, the apparatus comprising: a connection detection module for detecting apparatus information and subscriber information of the mobile terminal connected with the central management unit; a basic information collection module for checking a kind of the service and a menu in accordance with the kind of the service; and a rendering module for filtering a menu in accordance with the apparatus information of the menus and then transmitting the filtered menu to the mobile terminal.

The apparatus further comprising: a terminal group management module for generating terminal group information by classifying apparatus information of the mobile terminal in accordance with a predetermined rule; a content management module for generating a contents-apparatus information by connecting contents with corresponding terminal group information in case of storing the contents to be provided for the mobile terminal; and a menu management module for connecting the contents-apparatus information with a menu item and storing the same in case of generating a menu of a wireless internet to be provided for the mobile terminal.

It is a third aspect of the present invention to provide an apparatus for providing contents in a mobile communication system, the apparatus comprising: a connection detection module for detecting subscriber information of the mobile terminal in the case that the mobile terminal is connected with an integrating and managing apparatus; a terminal management module for managing apparatus information corresponding to subscriber information of the mobile terminal; a segment management module for managing a segment for providing contents with the mobile terminal in accordance with a predetermined rule by an operator and adjusting a layout of a menu in the segment; a menu management module for adjusting a browser type of the mobile terminal and a displayer form of the menu in the menu; and a rendering module, wherein the rendering module transmits a menu in accordance with the apparatus information to the mobile terminal by enabling the mobile terminal to receive a menu corresponding to the segment and to receive apparatus information from the terminal management module.

The rendering unit stores a predetermined program for displaying respective items of the menu as any one of a text type, an index type, an index under bar type and a pictogram type in accordance with the apparatus information.

It is a fourth aspect of the present invention to provide an apparatus for providing contents in a mobile communication system, the apparatus comprising: a connection detection module for extracting subscriber information and apparatus information of many pieces of information received from a mobile terminal connected through a wireless communication network and transmitting the same; and an authentication module for receiving client information and deciding an authentication thereof, and storing the client during a predetermined time in the case that the authentication is completed.

The authentication module omits an authentication of the client information in the case that the client information is stored at a predetermined memory.

The client information is stored at the predetermined memory during a predetermined time.

The subscriber information is any one of an MIN (Mobile Identification Number), an MDN (Mobile Directory Number) and client information, and the apparatus information is a phone type or a URI (Unique Resource Identity).

The transmission management unit further comprises an encryption module for converting the subscriber information and the apparatus information into a predetermined in the case that the subscriber information and the apparatus information is not a formation defined in an OMA (Open Mobile Alliance) standard.

The predetermined code is generated using a plug-in method.

The apparatus further comprising: a subscriber management module for automatically getting a subscriber terminal registered to a wireless internet by enabling a subscriber terminal to receive a wireless internet registration request in the case that a subscriber is affiliated with a wire communication network or a wireless communication network by searching registered subscriber service in accordance with a inquiry message transmitted from the authentication module.

The subscriber management module, a predetermined provisional data fills a data for affiliating except for the subscriber information and an apparatus information of the subscriber terminal of data requested in case of being affiliated with the wireless internet.

It is a fifth aspect of the present invention to provide a method for providing contents in a mobile communication system, the method comprising the steps of: A) generating terminal group information by classifying apparatus information of the mobile terminal in accordance with a predetermined rule; B) generating a contents-apparatus information by connecting contents with corresponding terminal group information in case of storing the contents to be provided for the mobile terminal; C) connecting the contents-apparatus information with a menu item and storing the same in case of generating a menu of a wireless internet to be provided for the mobile terminal; D) storing a menu layout of the wireless internet as a file form; E) managing a segment for adjusting a layout stored as a file form in the segment classified for providing contents with the mobile terminal in accordance with a predetermined rule; and F) adjusting a displayer form of respective items of the menu provided in the mobile terminal through the segment in accordance with the apparatus information.

The method further comprising the steps of: G) extracting client information including subscriber information and apparatus information connected with a wireless internet and searching a kind of a service to be provided for the mobile terminal; and H) reading a menu in accordance with the kind of the service, filtering a menu provided in accordance with apparatus information of the mobile terminal of the menu and then transmitting the same to the mobile terminal.

The predetermined rule includes at least one of a grade of picture quality the number of a chord supported by sound of the mobile terminal and a memory volume of the mobile terminal.

The terminal group information is one which classifies a RDF file registered by a terminal vendor in accordance with an efficiency of a terminal.

The menu is a directory menu having a tree structure.

The kind of the service is searched based on subscriber information of the mobile terminal, and a segment affiliated by a user of the mobile terminal.

The step (G) is performed by transmitting a menu adjusted by the searched segment and a view type of the menu in accordance with a browser type of the mobile terminal to the mobile terminal by checking a browser type of many piece of apparatus information, wherein the segment is a kind of the service to be provided for the mobile terminal and is affiliated by a user of the mobile terminal.

The browser type is any one of a browser for a text supporting a text and a browser for a multimedia supporting multimedia contents.

In case of adjusting a layout at the segment, a different layout is adjusted at respective layers of a menu connected with the segment.

The layout of the menu is embodied by adjusting a font of a character in accordance with a position displayed on a screen of the mobile terminal by an operator.

The method is performed by searching information of the mobile terminal and searching a segment affiliated by the mobile terminal based on the searched subscriber information.

The subscriber information is any one of an MIN (Mobile identification Number), an MDN (Mobile Directory Number) and client information, and the apparatus information is a phone type or a URI (Unique Resource Identity).

The menu includes a CP (Contents Provider) connection menu connected with position information of the contents and a directory menu not connected with position information of the contents, wherein a layout and a displayer form is adjusted at the CP (Contents Provider) connection menu and only a displayer form is adjusted at the directory menu.

The step (F) comprising the steps of: F-1) adjusting any one of a text type, an index type and an index under bar type as a displayer form in the case that a browser supported in the mobile terminal supports a text; and F-2) adjusting any one of a text type, an index type, an index under bar type and a pictogram type as a displayer form in the case that a browser supported in the mobile terminal supports multimedia contents.

The method further comprising the steps of: searching a layer of a present menu provided for the mobile terminal through a communication network; K) searching an icon corresponding to a menu item of a most significant layer in the case that the a layer (K) of the present menu is more than a second layer and belongs to a last layer (Y) provided by an operator; and L) displaying a most significant layer inside of an area allotted in a WAP page except for an icon linked with the present menu of the icons of the most significant layer.

The step (L) is performed by more displaying an icon linked with the present menu of the icons of the most significant layer.

The icon linked with the present menu is displayed in order to be different from icons of another most significant layer.

The step (L) further comprises a step of: L-1) embodying all icons in a predetermined position in the case that the number of the icon is under a predetermined number.

The step (L) further comprises a step of: L-2) embodying an icon having one less numbers than the predetermined number and remaining mobile icons in a predetermined position in the case that the number of the icon is more than a predetermined number.

The number of an icon embodied in the WAP page is decided in accordance with a picture size of the mobile terminal.

The method further comprising the steps of: i) providing the mobile terminal connected with a wireless or a wire internet with an initial menu; ii) searching icons corresponding to respective items of the initial menu in the case that one item of the initial menu is selected; and iii) displaying icons except for an icon corresponding to the selected item of the icons corresponding to respective items of the initial menu, on an allotted area of the WAP page in the case that a low layer menu in accordance with the selected item is embodied in a WAP page.

Embodying an icon having one less numbers (X−1) than the predetermined number and remaining mobile icons in a predetermined position of the WAP page in the case that the number of the icons is more than a predetermined number (X).

The number of an icon embodied in the WAP page is decided in accordance with a picture size of the mobile terminal.

The step (L) is performed by more displaying an icon corresponding to the selected item of the icons of the initial menu.

The icon corresponding to the selected item is displayed in order to be different from icons of the other initial menu.

The method further comprising the steps of: Ga) searching a layer of a present menu provided for the mobile terminal; Na) searching an icon corresponding to a menu item of a most significant layer in the case that the a layer (K) of the present menu is more than a second layer and belongs to a last layer (Y) provided by an operator; and Da) displaying a most significant layer inside of an area allotted in a WAP page except for an icon linked with the present menu of the icons of the most significant layer (K−1).

The method further comprising a step of: Ra) displaying an icon linked with the present menu on the allotted area.

The icon linked with the present menu is displayed in order to be different from icons of the other icons.

The step (G) further comprises the steps of: G-i) extracting client information including apparatus information and subscriber information of the mobile terminal connected with the central management unit and then transmitting the same to an authentication server; G-ii) discriminating whether the client information is provided with the authentication server; and G-iii) performing an authentication of the client information in the case that the discriminating result doesn't satisfy the condition of the step (G-ii) and storing then the authenticated client information at a predetermined memory.

The step (G) further comprises a step of: G-iv) omitting an authentication of the client information in the case that the discriminating result satisfies the condition of the step (G-ii).

The method further comprising a step of: G-v) automatically deleting the client information in the case that a predetermined time is elapsed.

The client information is any one of an MIN (Mobile Identification Number), an MDN (Mobile Directory Number) and client information.

The apparatus information is a predetermined file including a URI (Unique Resource Identity), a phone type and a browser type.

The method further comprising a step of: G-vi) converting the subscriber information and the apparatus information into a predetermined code in the case that the subscriber information and the apparatus information is not a form defined in an OMA (Open Mobile Alliance) standard.

The predetermined code is generated using a plug-in method.

The step (G) further comprises the steps of: G-1) extracting subscriber information of client information of the mobile terminal connected with the integrating and managing apparatus through the wireless internet and performing an authentication of the extracted subscriber information; G-2) transmitting an inquiry message as to whether to be affiliated with a wireless internet to the mobile terminal in the case that a subscriber has a due right but didn't register to a wireless internet in the authenticating result; and G-3) automatically affiliating with a wireless internet in the case that a terminal of the subscriber receives an agreement message of an affiliation with a wireless internet.

The due right is affiliated with at least one of a wireless communication network service and wire internet service designated by an operator of the wireless communication network.

In the step (G-3), a predetermined provisional data fills a data for affiliating except for the subscriber information and an apparatus information of the subscriber terminal of data requested in case of being affiliated with the wireless internet.

The step (G) further comprises a step of: G-4) accessing the subscriber terminal to a wireless internet in the case that a subscriber has a due right and registered to a wireless internet in the authenticating result.

It is a sixth aspect of the present invention to provide a method for providing contents in a mobile communication system, the method comprising the steps of: S1) connecting with an integrating and managing apparatus managing a wireless internet connection of the mobile terminal; S2) detecting apparatus information of the connected mobile terminal, and searching a kind of a service to be provided for the mobile terminal; and S11) reading a menu in accordance with the kind of the service, filtering a menu matched with apparatus information of the mobile terminal of the menu and then transmitting the same to the mobile terminal.

The apparatus information of the step (S11) includes at least one of a grade of picture quality, the number of a chord supported by sound of the mobile terminal and a memory volume of the mobile terminal, and is classified by the respective information.

The kind of the service is a segment affiliated by a user of the mobile terminal.

The method for matching the apparatus information and the menu comprising the steps of: S11-a) generating contents-apparatus information by connecting the contents with the classified apparatus information in case of storing contents to be provided for the mobile terminal; and S11-b) connecting the contents-apparatus with a menu item in case of generating a menu of the wireless internet.

The menu is a directory menu having a tree structure.

It is a seventh aspect of the present invention to provide a method for providing contents in a mobile communication system, the method comprising the steps of: X-i) searching a segment and a browser type affiliated by a mobile terminal in the case that the mobile terminal connects with an integrating and managing apparatus for managing an operation of a wireless internet; and X-ii) transmitting a menu adjusted by the searched segment and a view type of the menu in accordance with a browser type of the mobile terminal to the mobile terminal.

The browser type is any one of a browser for a text supporting a text and a browser for a multimedia supporting multimedia contents.

In case of adjusting a layout at the segment, a different layout is adjusted at respective layers of a menu connected with the segment.

The layout of the menu is embodied by adjusting a font of a character in accordance with a position displayed on a screen of the mobile terminal by an operator.

The step (X-i) further comprises the steps of: X-i-1) connecting with a transmission unit of an integrating and managing apparatus for managing an operation of a wireless internet by the mobile terminal; X-i-2) detecting subscriber information and apparatus information of the mobile terminal by the transmission unit; and X-i-3) searching a segment affiliated by the mobile terminal based on the subscriber information.

The browser type is searched by apparatus information of the mobile terminal.

The subscriber information is any one of an MIN (Mobile identification Number), an MDN (Mobile Directory Number) and client information, and the apparatus information is a phone type or a URI (Unique Resource Identity).

It is an eighth aspect of the present invention to provide a method for providing contents in a mobile communication system, the method comprising the steps of: Y-1) adjusting a view type of respective items provided for a mobile terminal in accordance with a browser type of the mobile terminal; Y-2) searching apparatus of a mobile terminal in the case that the mobile terminal connects with a wireless internet; and Y-3) searching a browser type of the mobile terminal included in the apparatus information, and transmitting the menu having a view type adjusted in accordance with the browser type to the mobile terminal.

The step (Y-3) further comprises the steps of: Y-11) adjusting any one of a text type, an index type and an index under bar type as a displayer form in the case that a browser supported in the mobile terminal supports a text; and Y-12) adjusting any one of a text type, an index type, an index under bar type and a pictogram type as a displayer form in the case that a browser supported in the mobile terminal supports multimedia contents.

It is a ninth aspect of the present invention to provide a method for providing contents in a mobile communication system, the method comprising the steps of: T-1) searching a layer of a present menu provided for the mobile terminal through a communication network; T-2) searching an icon corresponding to a menu item of a most significant layer in the case that the a layer (K) of the present menu is more than a second layer and belongs to a last layer (Y) provided by an operator; and T-3) displaying a most significant layer inside of an area allotted in a WAP page except for an icon linked with the present menu of the icons of the most significant layer.

The step (T-3) is performed by more displaying an icon linked with the present menu of the icons of the most significant layer.

The icon linked with the present menu is displayed in order to be different from icons of another most significant layer.

The step (T-3) further comprises a step of: T-31) embodying all icons in a predetermined position in the case that the number of the icon is under a predetermined number.

The step (T-3) further comprises a step of: L-31) embodying an icon having one less numbers than the predetermined number and remaining mobile icons in a predetermined position in the case that the number of the icon is more than a predetermined number.

The number of an icon embodied in the WAP page is decided in accordance with a picture size of the mobile terminal.

It is a tenth aspect of the present invention to provide a method for providing contents in a mobile communication system, the method comprising the steps of: W-1) searching subscriber information of client information of the mobile terminal connected with a wireless internet; W-2) performing an authentication of the subscriber information; W-2) transmitting an inquiry message as to whether to be affiliated with a wireless internet to the mobile terminal in the case that a subscriber has a due right but didn't register to a wireless internet in the authenticating result; and W-4) automatically affiliating with a wireless internet in the case that a terminal of the subscriber receives an agreement message of an affiliation with a wireless internet.

The due right is affiliated with at least one of a wireless communication network service and wire internet service designated by an operator of the wireless communication network.

In the step (W-4), a predetermined provisional data fills a data for affiliating except for the subscriber information and an apparatus information of the subscriber terminal of data requested in case of being affiliated with the wireless internet.

The method further comprising a step of:

W-5) affiliating the mobile terminal with a wireless internet in the case that a subscriber has a due right and registered to a wireless internet in the authenticating result.

It is an eleventh aspect of the present invention to provide an automatic authentication method in a wireless internet the method comprising the steps of: Q-i) connecting a mobile terminal with a proxy server for connecting with a wireless internet through a wireless communication network; Q-ii) extracting client information including apparatus information and subscriber information of the mobile terminal connected with the central management unit and then transmitting the same to an authentication server; Q-iii) discriminating whether the client information is provided with the authentication server; and Q-iv) performing an authentication of the client information in the case that the discriminating result doesn't satisfy the condition of the step (Q-Iii) and storing then the authenticated client information at a predetermined memory.

The step (Q-v) further comprises a step of: G-iv) omitting an authentication of the client information in the case that the discriminating result satisfies the condition of the step (G-iii).

The method further comprising a step of: Q-vi) automatically deleting the client information in the case that a predetermined time is elapsed.

The client information is any one of an MIN (Mobile Identification Number), an MDN (Mobile Directory Number) and client information.

The apparatus information is a predetermined file including a URI (Unique Resource Identity), a phone type and a browser type.

The method further comprising the steps of: Q-vii) discriminating whether the subscriber information and the apparatus information is not a formation defined in an OMA (Open Mobile Alliance) standard; and Q-viii) converting the subscriber information and the apparatus information into a predetermined code in the case that the subscriber information and the apparatus information is not a formation defined in an OMA (Open Mobile Alliance) standard in the discriminating result of the step (Q-vii).

Advantageous Effects

As described above, the present invention can provide a management which provides a subscriber of a wireless terminal with a client personalization service, an intuitional and an accessible user interface, an authenticity, of security, convenient access, fast access to contents and a use of qualitative time.

In addition, according to the present invention, a visual monotony can be overcome by providing a mobile terminal with a layout of various menus and a view type and a user can easily sensitively realizes a content of the menu. And a convenience of a menu use is enhanced by displaying a most significant menu in a predetermined area in case of displaying on a screen of a mobile terminal.

Moreover, according to the present invention, a needless web surfing can is reduced by differently providing a menu in accordance with an efficiency of a mobile terminal, and an inconveniency is resolved that only after a user of a mobile terminal accesses a wireless internet and selects desired contents, the user can reproduce the selected contents through a his/her mobile terminal.

In addition, according to the present invention, because client information of a mobile terminal authenticated in a wireless internet can be maintained during a predetermined time, a time loss in accordance with the authentication and a system load can be reduced. And a release of client information is prevented beforehand by respectively encrypting subscriber information and apparatus information and transmitting the same to a contents providing terminal or an external server.

Accordingly, according to the present invention, mobile network operator provides contents providers with a platform that is on the basis of a rule, can expand, can satisfy items requested from a present contents providers and can be effectively rapidly applied to an ongoing business and technical circumstances.

DESCRIPTION OF DRAWINGS

These and/or other aspects and advantages of the invention will become apparent and more readily appreciated from the following description of the preferred embodiments, taken in conjunction with the accompanying drawings of which:

FIGS. 6 through 10 illustrate an interior block diagram of a web page provided from an integrating and managing apparatus in accordance with an embodiment of the present invention;

Figure 1:
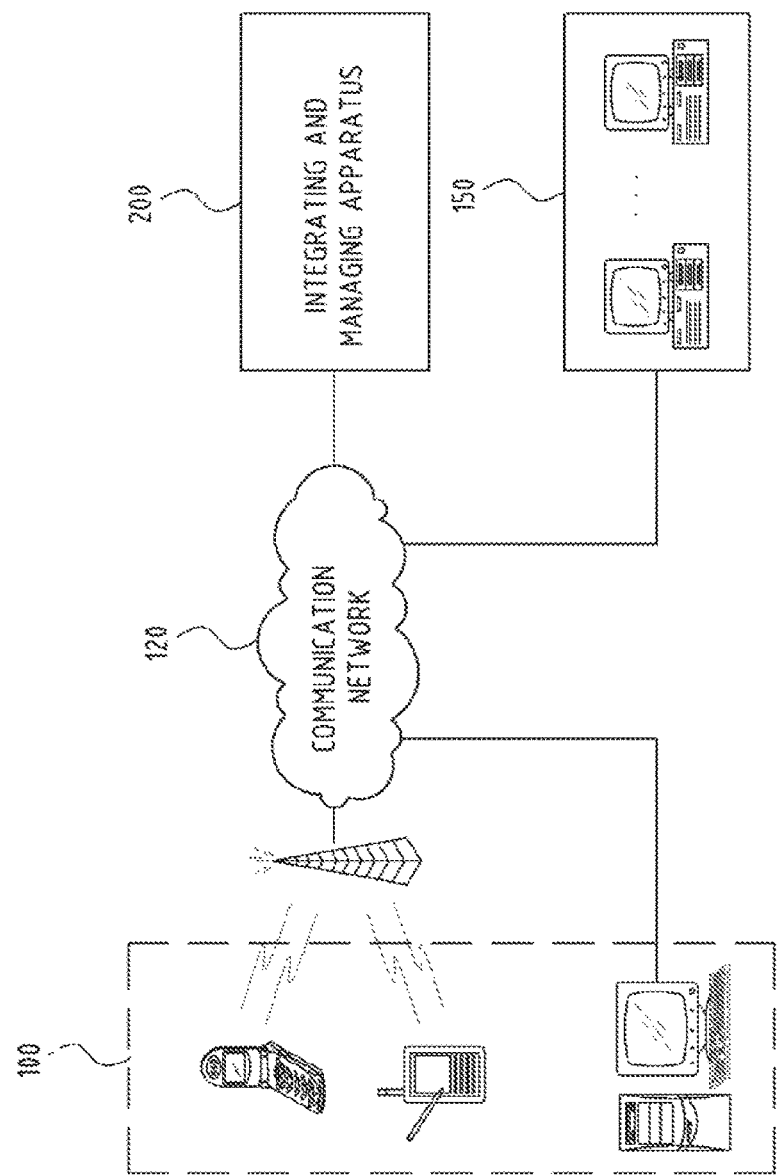
FIG. 1 illustrates a block diagram of a system for providing contents from a mobile communication system in accordance with an embodiment of the present invention.

The following Examples are given for the purpose of illustration only and are not intended to limit the scope of this invention.

BEST MODE

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity. Also, like reference numerals refer to like elements throughout.

Referring to FIGS. 1 to 27, a preferable embodiment that easily embodied by a person having ordinary skill in the same art that belongs to the present invention will be described in more detail.

FIG. 1 illustrates a block diagram of a system for providing contents from a mobile communication system in accordance with an embodiment of the present invention.

Referred to FIG. 1, a mobile communication system in accordance with the present invention comprises a communication network 120 and an integrating and managing apparatus 200, and further comprises a subscriber terminal 100, a content providing terminal 150 and an external server 170.

The communication network 120 includes a wire network and a wireless network, and respectively connects the subscriber terminal 100, the content providing terminal 150 and the external server 170.

The subscriber terminal 100 includes a cellular phone performing a wireless communication, a mobile terminal including a PDA and a computer performing a wire communication.

The subscriber terminal 100 in accordance with an embodiment of a mobile terminal is a mobile terminal, the subscriber terminal 100 will be explained by limiting to a mobile terminal for the convenience of a following explanation and reference numerals of mobile terminal is identically disclosed. However, the subscriber terminal 100 is not limited to a mobile terminal.

Content providers in accordance with the present invention is an operator who wishes to provide the subscriber terminal 100 with a service including an application program and contents composed of various data.

The integrating and managing apparatus 200 has an open framework including a content provider access unit, a central management unit, a transmission unit and an interface unit, and thus is a portal platform having adaptability and a modularity, which can be embodied together with another solution.

Also the integrating and managing apparatus 200 supports a worldwide standard related to a wireless business such as a WAP (Wireless Application Protocol).

And also the integrating and managing apparatus 200 enables the content provider to rapidly start a service by integrating and managing a data in accordance with the content provider, a service and contents of the content provider and a menu of the content provider. Moreover, the integrating and managing apparatus 200 provides an authority model based on a service based subscription and CP (Contents Provider) policy.

The integrating and managing apparatus 200 provides a search engine for a mobile terminal and a web page so as to perform a search using a code and a search in accordance with a keyword by a subscriber's mobile terminal.

The content providing terminal 150 is endowed with an account from the integrating and managing apparatus 200 through the communication network 120 and registers a service to be provided by the subscriber terminal 100. And the content providing terminal 150 provides the subscriber terminal 100 with position information contents and an option that the contents can be embodied.

In one example, an operator of the mobile communication system 300 manages the content providing unit 150. The content providing unit 150 is done a grouping and operated in accordance with a kind of a service, and stores and manages contents in accordance with the service. At this time, the integrating and managing apparatus 200 enables the content providing terminal 150 to provide the subscriber terminal 100 with the service. Namely, the integrating and managing apparatus 200 performs a total management for providing contents.

The integrating and managing apparatus 200 is connected with the external server 170, and the external server 170 includes a billing server and a short message server, etc.

FIGS. 2 through 5 illustrate a simplified internal block diagram of an integrating and managing apparatus in accordance with an embodiment of the present invention in FIG. 1.

Figure 2:
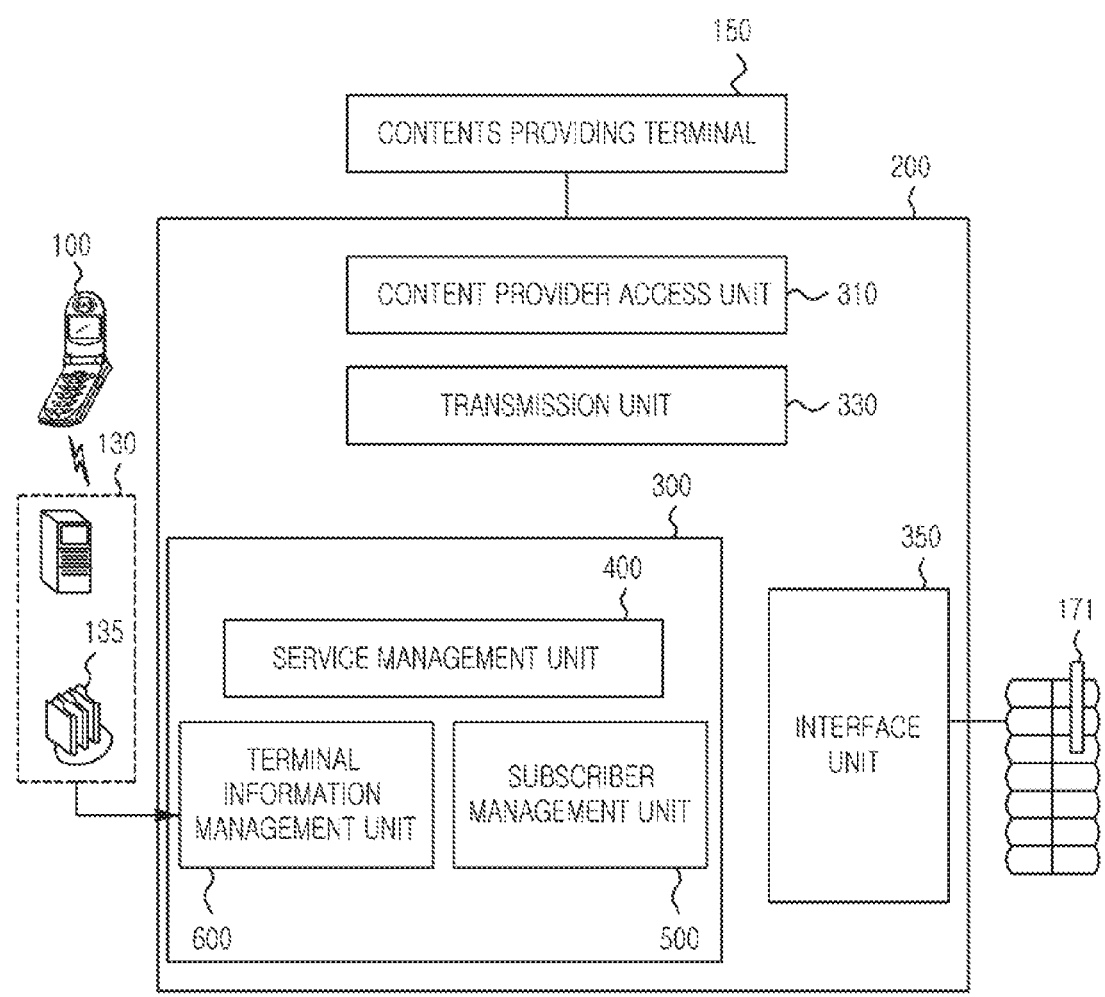
FIGS. 2 through 5 illustrate a simplified internal block diagram of an integrating and managing apparatus in accordance with an embodiment of the present invention in FIG. 1.

As depicted in FIG. 2, the integrating and managing apparatus 200 comprises a contents provider access unit 310, a central management unit 300, a transmission unit 330 and an interface unit 350.

The contents provider access unit 310 provides the content providing terminal 150 with a connection interface in order that the content providing terminal 150 can be connected with the integrating and managing apparatus 200. The connection interface provides an authentication of the connected contents providing terminal 150 and communicates with the authenticated contents providing terminal 150 in accordance with a predetermined rule.

In addition, the contents provider access unit 310 responds to an inquiry request of information related to a service such as a subscriber's profile, etc affiliated with the service requested by the contents providing terminal 150, and manages a connection of the contents providing terminal 150, the inquiry request and a rule related to the contents provider. Additionally speaking, the contents provider access unit 310 provides an authentication with the contents providing terminal 150 connected through the communication network 120, and provides a connection interface for communicating with the authenticated contents providing terminal 150 in accordance with a predetermined rule.

In case of be connected with the contents provider access unit 310, a predetermined plug-in is provided for the contents providing terminal 150 in accordance with a connection control management rule. In addition, a plug-in of an existing system can is used in the integrating and managing apparatus 200 through an asynchronous interface.

Furthermore, the contents provider access unit 310 inquires an inquiry item inputted from the contents providing terminal 150 connected to the integrating and managing apparatus 200. One example of the inquiry item is a profile of a service subscriber and apparatus information of a subscriber terminal, etc. in addition, the contents provider access unit 310 manages a rule related to the contents provider.

According as the contents providing terminal 150 connects with the contents provider access unit 310 and then registers a service for being provided for subscriber terminal 100 in the integrating and managing apparatus 200, the service is managed through the integrating and managing apparatus 200.

The central management unit 300 comprises a service management unit 400 for managing a service of contents providers, a subscriber management unit 500 for managing a subscriber affiliated with the service, a terminal information management unit 600 for managing terminal related information of the subscriber and a management unit (not shown) for managing other service operation and an authentication.

The central management unit 300 interlocks with the transmission unit 330, and comprises a transmission interface (not shown) forming a transmission channel with the subscriber terminal 100 and a management unit (not shown) for managing information requested for a transmission.

In addition, the interface unit 350 comprises an interface connection unit 352 for communicating with an external server 170 interlocked with the integrating and managing apparatus 200 and an interface management unit 354 for performing an interface management. The interface connection unit 352 is able to transmit/receive a predetermined data by having a protocol in accordance with the external server 170 and being directly connected with the external server 170. And also the interface unit 350 manages a configuration of the external server 170.

For example, the interface unit 350, in case of servicing a short message by being connected with a short message service server that is one example of the external server, stores and manages a billing data in accordance with a provision of the short message according to the service rule and periodically transmits the same to a billing server that is another external server 170.

In another applied example, the interface unit 350 periodically provides a billing server with a billing data by storing and managing the billing data according to providing a predetermined service or contents generated in accordance with the service rule in the case that the interface unit 350 provides the predetermined service or the contents in accordance with a service provision request of the authenticated subscriber terminal.

Figure 3:
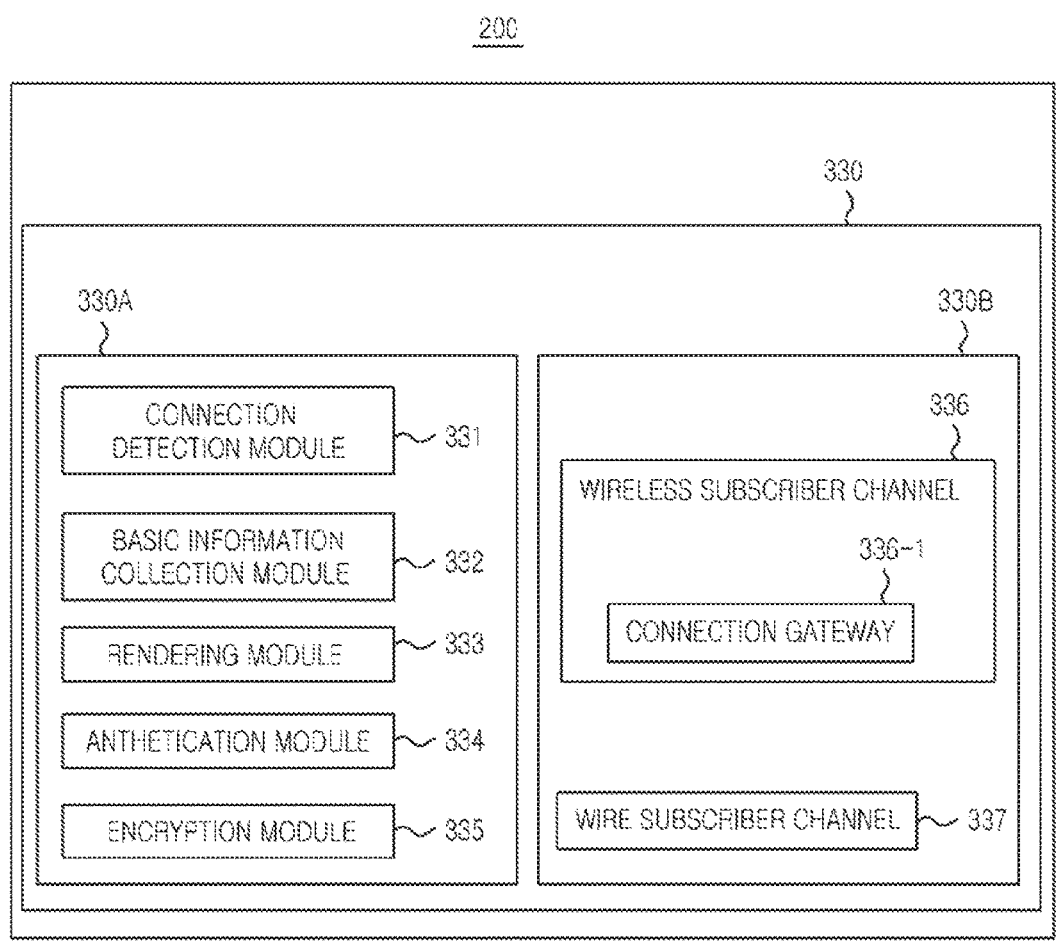

FIG. 3 illustrates a detailed block diagram of a transmission unit of an integrating and managing apparatus in accordance with an embodiment of the present invention.

Referred to FIG. 3, the transmission unit 330 comprises a transmission management 330A and a transmission channel 330B.

The transmission management unit 330 comprises a connection detection module 331, a basic information collection module 332, a rendering module 333, an authentication module 334 and an encryption module 335, for obtaining client information of the subscriber terminal affiliated with the integrating and managing apparatus 200 through the communication network 120 and authenticating the same, and extracting apparatus information of many piece of the client information and transmitting the same to the central management unit 300.

The connection detection module 331 detects apparatus information and subscriber information of the mobile terminal connected with the integrating and managing unit 200 through a wireless internet.

The basic information collection module 332 searches a kind of the service affiliated by a user of the mobile terminal 100 based on the subscriber information detected from the connection detection module 331. Namely, the basic information collection module 332 searches which segment is the user affiliated with. In addition, the basic information collection module 332 reads a menu supported in the segment. In an applied example, the basic information collection module 332 provides a history menu of the subscriber terminal by storing a menu selected by the subscriber terminal during a predetermined time.

The rendering module 333 filters a menu in accordance with the apparatus information of the menus read based on information collected from the basic information collection module 332 and then transmitting the filtered menu to the mobile terminal 100. In addition, the rendering module 333 converts the menu into a layout (or template) and/or a view type of menu items in accordance with the terminal information and transmits the same to the mobile terminal 100. The rendering module 333 stores a predetermined program to embody various layouts of a menu.

A one example of various layouts of a menu is depicted in FIGS. 18 through 24.

Figure 19:
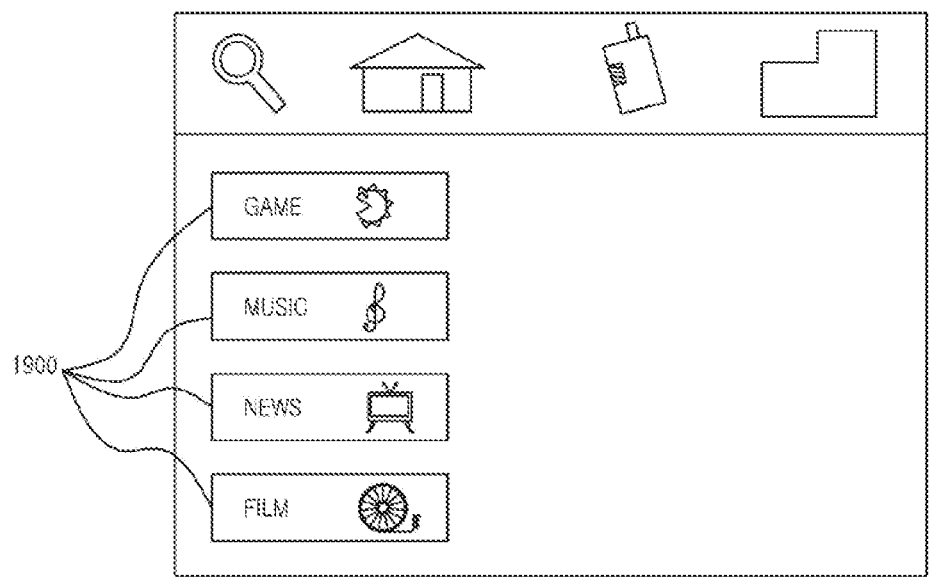
FIGS. 19 through 24 illustrate an exemplary menu provided for a mobile terminal in accordance with an embodiment of the present invention.
Figure 21:
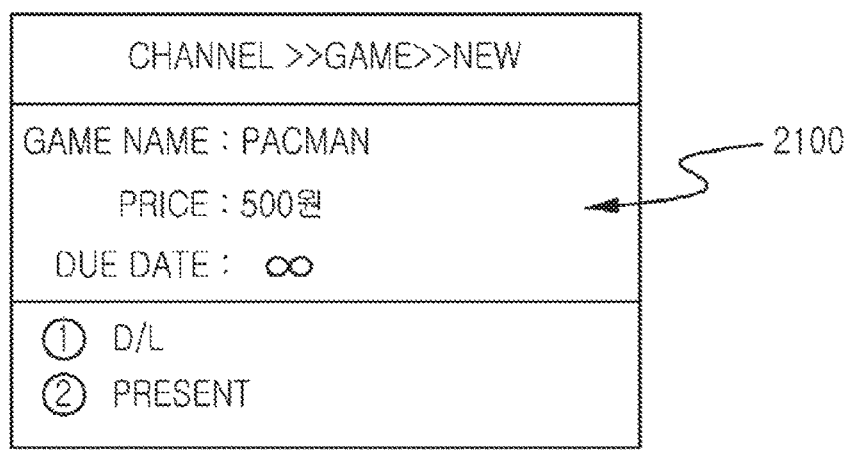
Figure 22:
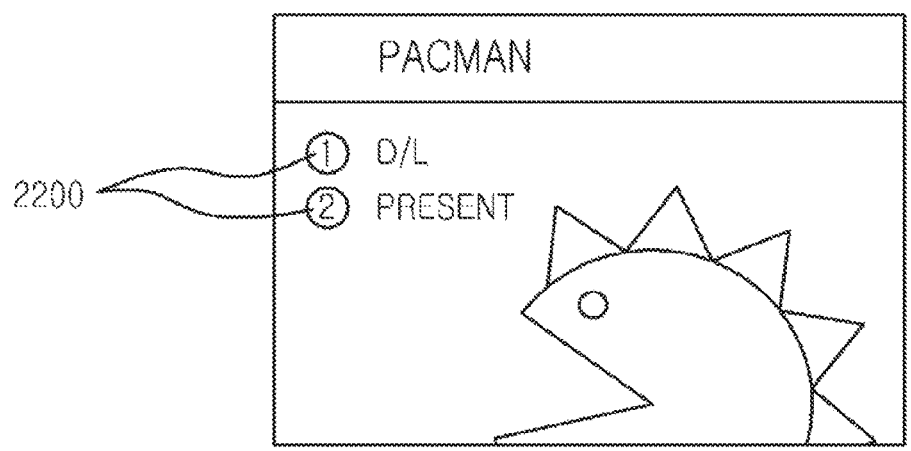
Figure 23:
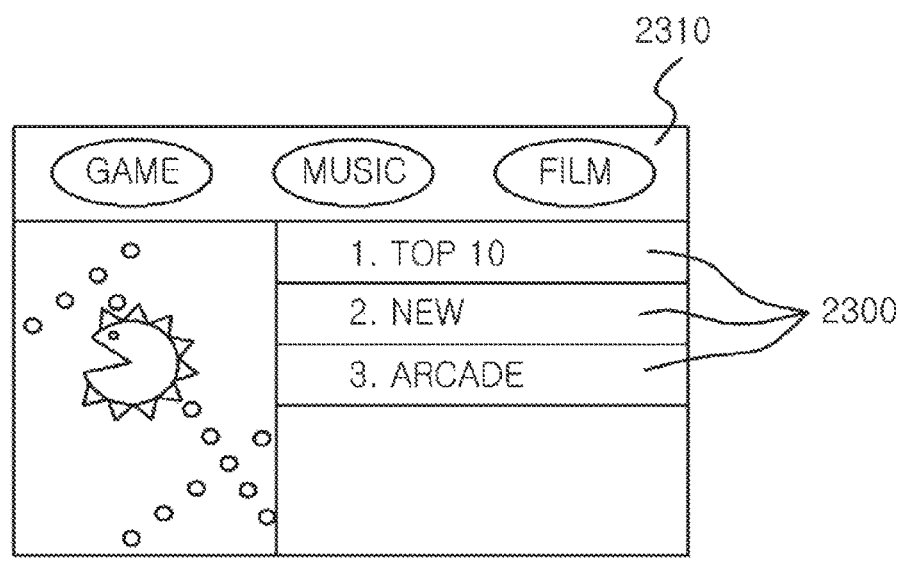
Figure 24:
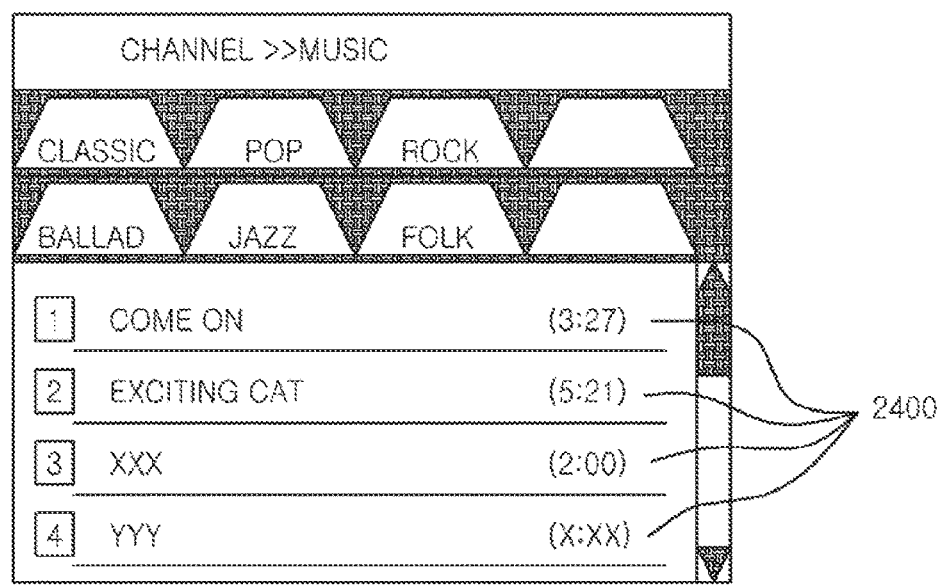
Figure 25:
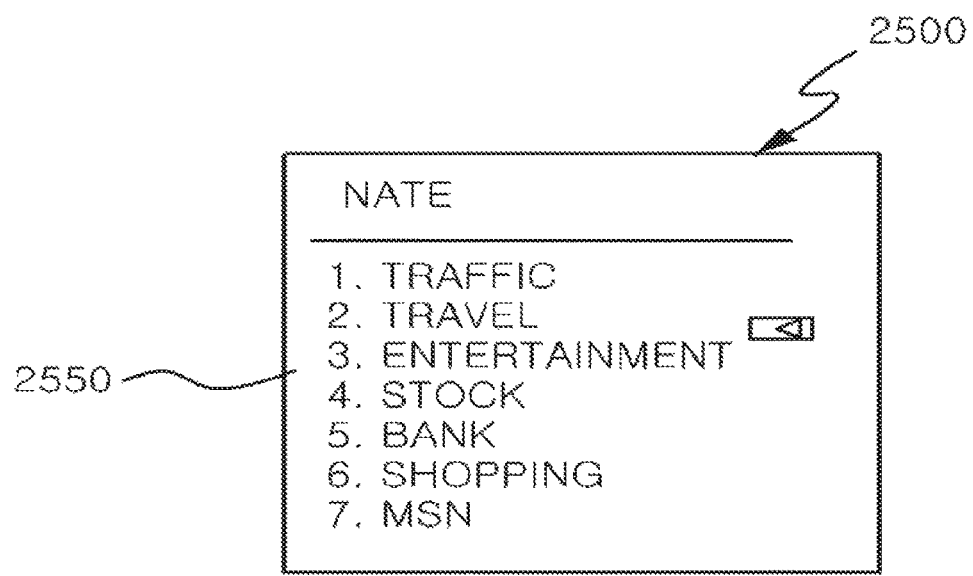
FIGS. 25 through 27 illustrate another exemplary menu provided for a mobile terminal in accordance with an embodiment of the present invention.

In addition, various view types embodied as respective items of a menu are stored as a predetermined program. The view type includes a text type 2100 as depicted in FIG. 21, an index type 2200 and 2300 as depicted in FIGS. 22 through 23, an index under bar type 2400 as depicted in FIG. 24 and a pictogram type 1900 as depicted in FIG. 19, etc.

The authentication module 334 performs an authentication for discriminating whether a connected subscriber terminal has a due right based on subscriber information and apparatus information detected from the connection detection module 331. The subscriber information is any one of an MIN (Mobile Identification Number; referred to as "MIN" hereinafter), an MDN (Mobile Directory Number; referred to as "MDN" hereinafter) and client information, and the apparatus information is a phone type or a URI (Unique Resource Identity; referred to as "URI" hereinafter).

The authentication module 334 discriminates a condition as to whether the client information is due, and provisionally stores the client information at a predetermined in case of being a due in the authenticating result. A user can change the time stored at the memory.

The authentication module 334 omits an authentication of the client information in the case that the received client information is stored at the memory, but client information of a mobile terminal, which is re-connected after the time adjusted by a user surpasses, has to be again authenticated because the subscriber information is stored at the memory during a specific time.

The encryption module 335 converts the subscriber information and the apparatus information into a predetermined in the case that the subscriber information and the apparatus information is not a formation defined in an OMA (Open Mobile Alliance; referred to as "OMA" hereinafter) standard. Namely, the encryption module 335 converts the client information into a predetermined code using a plug-in method.

The transmission channel unit 330B provides the authenticated subscriber terminal with the service menu generated in accordance with the apparatus information and contents of the subscriber terminal obtained from the transmission management unit 330A, transmits/receives through a wireless subscriber channel 336 in the case that the subscriber is a mobile terminal, and transmits/receives through a wire subscriber channel 337 in the case that the subscriber is a wire terminal.

The wire subscriber channel 337 registers a user history connected through a log in as a log file, but the wireless subscriber channel 336 does not have a log file generation function. Accordingly, in the present invention, the connection gateway 336-1 generates a predetermined cookie based on apparatus information of client information of a subscriber terminal connected through a wireless network and performs a user agent processing for protecting the client information.

Figure 4:
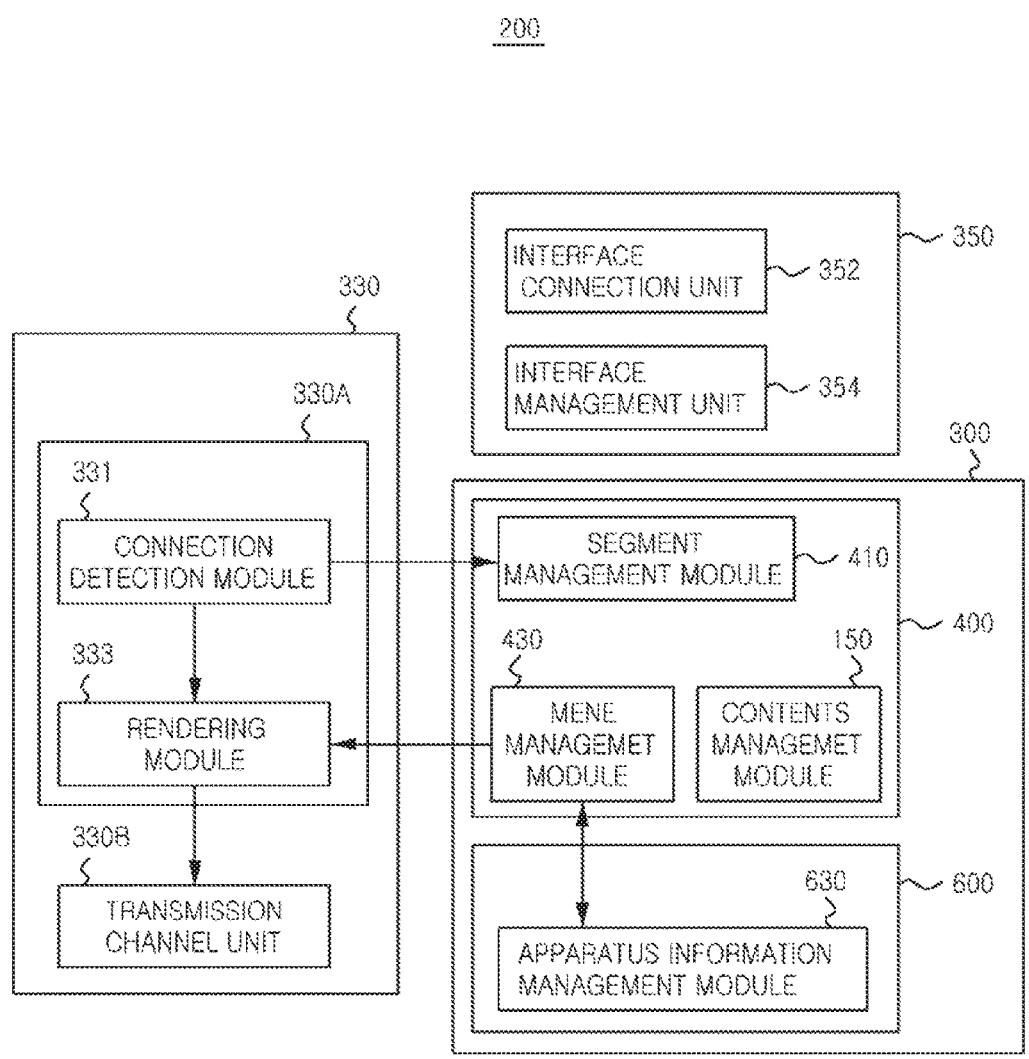
Figure 5:
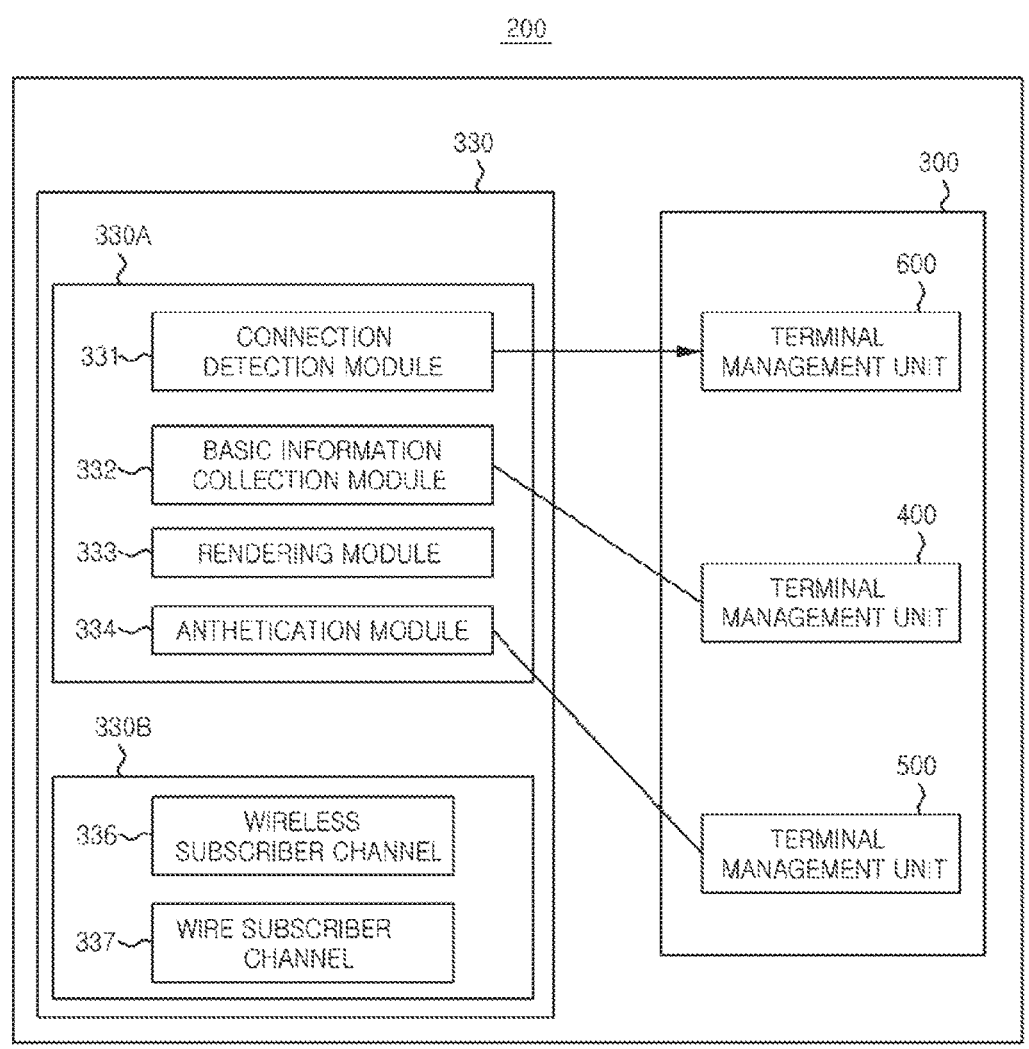

FIGS. 4 through 5 illustrates a detailed block diagram of a central management unit interlocked with a transmission unit of an integrating and managing apparatus in accordance with an embodiment of the present invention.

The central management unit 300 comprises a service management unit 400, a subscriber management unit 500, a terminal management unit 600 and a search engine (not shown).

The service management unit 400 comprises a segment management module 410, a menu management module 430 and a contents management module 450. The segment is a service group generated by an operator in accordance with a predetermined rule, and a user of a mobile terminal is provided with a service for downloading contents through the segment. In addition, an operator can form a segment group by doing a grouping more than two segments.

The segment management module 410 can detect which segment is a user of the mobile terminal affiliated with by storing a segment or a segment group corresponding to subscriber information. And the segment management module 410 stores information supported by the segment and as for which layout is the menu displayed as.

The menu management module 430 manages a browser type of the mobile terminal and a view type of the menu.

The contents management module 450 is connected with the contents provider access unit 310 of the integrating and managing apparatus 200, receives position information (namely, a contents entry point) to be provided for the mobile terminal 100 from the contents providing terminal 150 registering an account and registers the same. At this time, the contents management module 450 stores option information of a mobile terminal to be embodied and apparatus information thereof by contents provider. Namely, the contents management module 450 generates contents-apparatus information (contents & handset URI combination) that connects apparatus information generated and classified by the terminal group information management module 610 with contents information.

Contents provided for the mobile terminal 100 are stored at the contents providing terminal or a predetermined database, and is not stored at the integrating and managing apparatus 200. Thus, the contents providing terminal 150 directly provides the contents with the mobile terminal 100 in the case that a contents request from the mobile terminal is transferred to the contents providing terminal 150 through the integrating and managing apparatus 200.

A mobile network operator (referred to as "operator" hereinafter) generates a menu of an wireless internet to be provided for a mobile terminal from the menu management module 440 based on the contents connection point registered by the contents providing terminal 150.

Additionally speaking, apparatus information is added to a menu by registering the contents-apparatus information (contents & handset URI combination) generated from the contents management module 450 in case of registering the menu.

The subscriber management unit 500 comprises a web subscriber management module and a WAP subscriber management module.

The web subscriber management module stores and manages subscriber information affiliated with a wire internet. and the WAP subscriber management module stores and manages subscriber information affiliated with a wireless internet In addition, the subscriber management unit 500 the connection detection module 331, in the case that a user of a mobile terminal connected with a wireless internet requests an affiliation with the wireless internet, uses subscriber information and apparatus information as a data for registering requested in case of registering. A subscriber name, an address, a social security number, ID and a password, etc are substituted for a provisional data provided from the subscriber management unit 500.

Subscriber information affiliated with a wire internet or a wireless internet through a terminal agency is transmitted to subscriber management unit 500 through a rule related server which is an external 170.

The terminal management unit 600 comprises a terminal group information management module 610 and an apparatus information management module 630.

The terminal management unit 600 manages apparatus information of all kinds of a mobile terminal, and especially the terminal group information management module 610 classifies and stores a terminal having an identical function. At this time, the identical function of a terminal represents a grade of picture quality (whether to be a high picture quality or not), the number of a chord supported by sound of the mobile terminal and a memory volume of the mobile terminal. One example of the terminal classification is a mobile terminal that has a high picture quality and a camera, a mobile terminal that has a high picture quality and 64 chords and a mobile terminal that is black and white and 64 chords.

A search engine (not shown) searches contents desired by a subscriber at a predetermined database in accordance with a contents request message received from a subscriber terminal and transmits the same. In case of not existing at the predetermined database, the search engine requests the contents providing terminal 150 to transmitting the contents to the subscriber terminal 100.

An operation of the present invention composed as mentioned above will be explained.

FIGS. 11 through 17 are a flow chart illustrating a method for providing contents through integrating and managing apparatus in accordance with an embodiment of the present invention.

Figure 11:
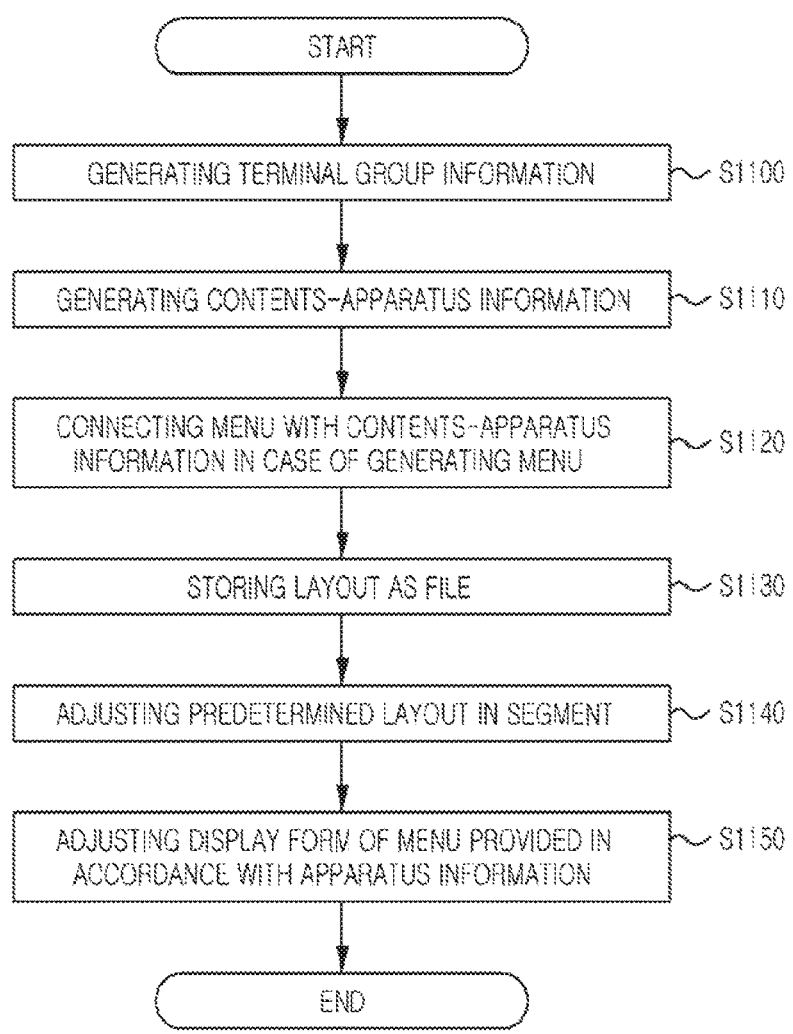
FIGS. 11 through 18 are a flow chart illustrating a method for providing contents through integrating and managing apparatus in accordance with an embodiment of the present invention.

FIG. 11 is a flow chart illustrating a menu adjustment process of apparatus information of a mobile terminal in accordance with an embodiment of the present invention.

A mobile terminal 100 classifies the apparatus information in accordance with a predetermined rule and then generates terminal group information (S1100).

At this time, a classification of the apparatus information in accordance with the predetermined rule is performed by a screen size of the mobile terminal, the number of a color supported from the mobile terminal, whether to be a mobile terminal having a camera or not the number of a chord supported by sound of the mobile terminal and a memory built-in, etc and can be modified by an operator.

Information of contents is registered through the contents management module 420 of the integrating and managing apparatus 200 in the case that a contents provider provides a service the mobile terminal 100 through the integrating and managing apparatus 200. Namely, a contents provider registers a URI (Uniform Resource Locater) on which the contents located together with a contents name or an ID. At this time, the contents provider also registers an option of a mobile terminal that the contents can be embodied.

Additionally speaking, contents-apparatus information of terminal group information generated in the step (S1100) is selected and then generated in case of registering the contents (S1110).

Figure 6:
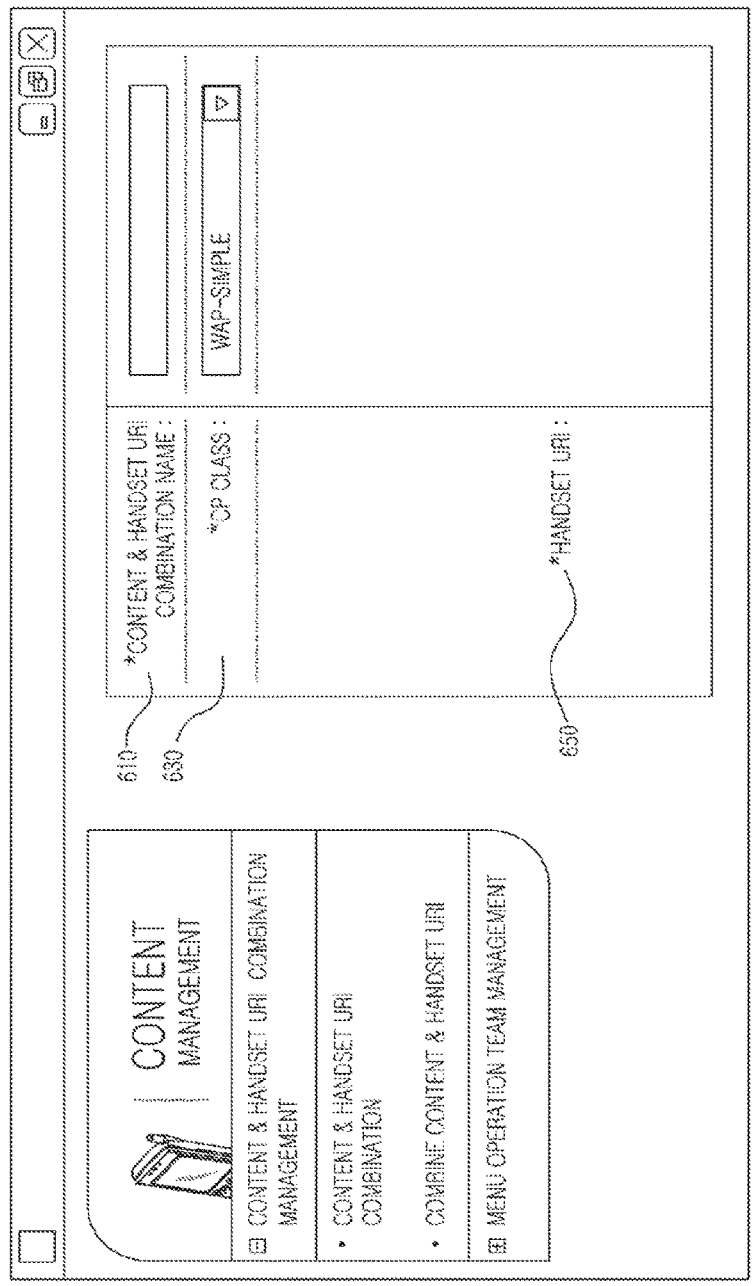
Figure 8:
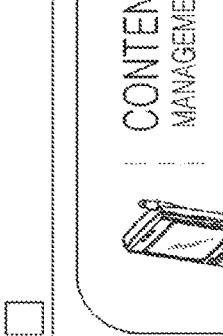

A web page in FIG. 6 is one embodiment generating the contents-apparatus information. As depicted in FIG. 6, at least one of a handset URI 650 at which characteristic of a mobile terminal are stored is selected in a CP (Contents Provider) class 630 classifying contents in accordance with the characteristic, and then is generated by booking a name of the contents-apparatus information. The contents-apparatus information is registered as a RDF file in the terminal information management unit 600 of the integrating and managing apparatus 200. A list of the generated contents-apparatus information is depicted in FIG. 7.

An operator generates a menu of a wireless internet to be provided for the mobile terminal 100 connected with the wireless internet. The menu comprises a directory menu with which a contents connection menu, which is position information, cannot be connected and a CP entry menu embodied so as to be connected with the contents connection menu.

A menu is provided in accordance with apparatus information by connecting a directory menu of the menus with the contents-apparatus information (S1120).

In addition, after a layout of a menu provided for the mobile terminal is generated by an operator, and then is stored as a file type (S1130).

An operator can adjust any one of the stored layouts in case of generating and/or modifying (S1140). If a layout adjusted in a segment, a menu has a layout and is displayed on a screen in the case a mobile terminal affiliated with the segment accesses a wireless internet.

Figure 20:
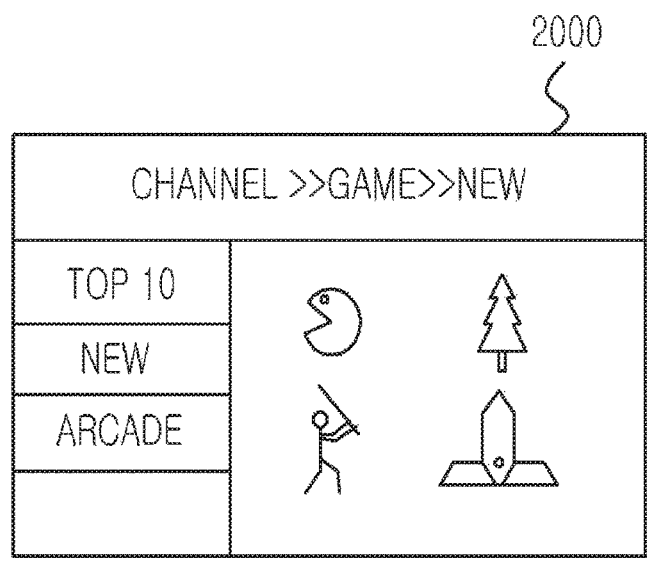

In an applied example, in the case that the segment is adjusted, a layout adjusted in each layer of a menu connected with the segment is different from each other. FIGS. 19 and 20 illustrates a screen on which a layout of a menu provided for a subscriber terminal belonging to same segment is displayed.

In addition, a view type corresponding to respective items of a menu is adjusted in accordance with apparatus information of a mobile terminal (S1150).

Additionally speaking, the menu comprises a CP entry menu connected with storage position contents information of the contents and a directory menu with which position information of the contents is not connected. At this time, the layout is only adjusted in a directory menu, but a view type is adjusted also in a CP connection menu as well as the directory menu.

In addition, a character font of a layout of the menu can be adjusted by an operator in accordance with a position that the menu items are displayed on a screen of the mobile terminal.

Figure 12:
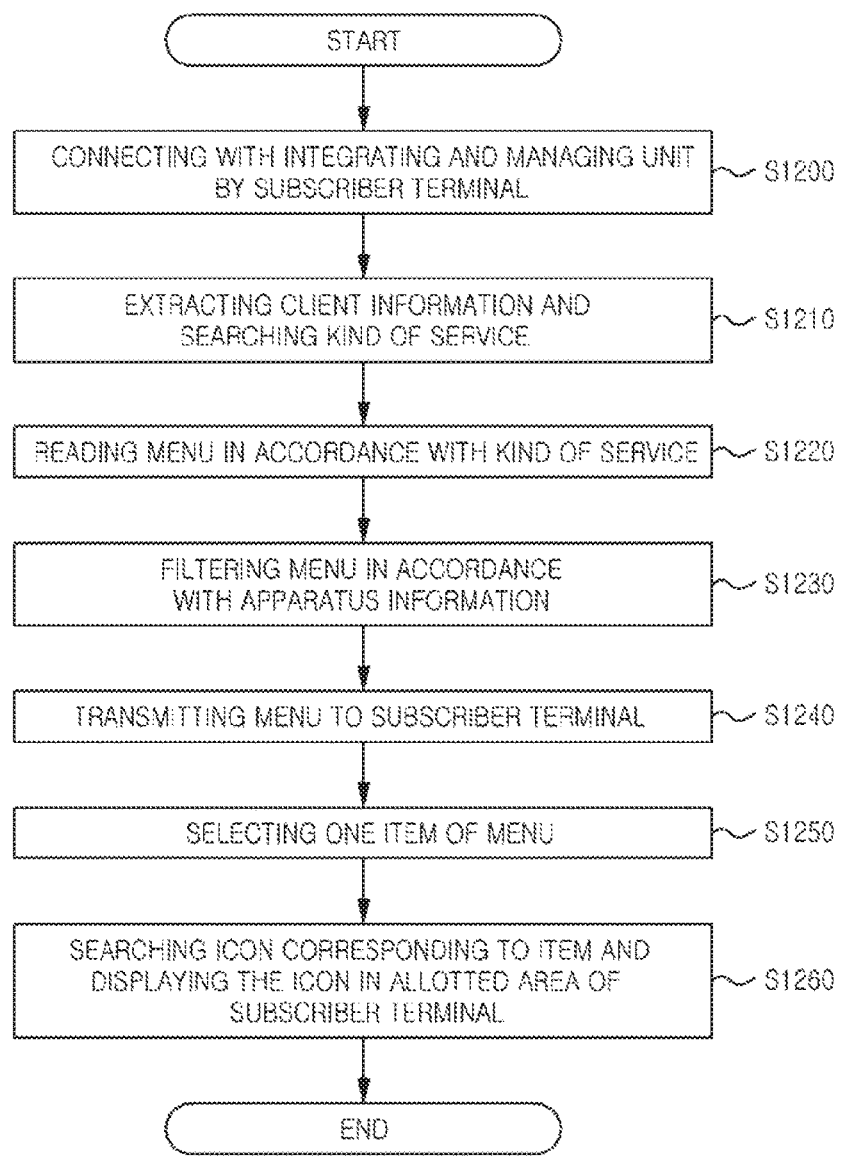

FIG. 12 is a flow chart illustrating a process for transmitting to the mobile terminal a menu adjusted in accordance with apparatus information of a mobile terminal.

In the case that the mobile terminal 100 is connected with the integrating and managing apparatus 200, a connection detection module 331 of the integrating and managing apparatus 200 detects apparatus information and subscriber information, and the basic information collection module 332 discriminates what service was the subscriber affiliated from on the basis of subscriber information detected from the connection detection module 331 (S1200, S1210). Namely, the basic information collection module 332 discriminates what segment group does the subscriber belong to and what segment group was the subscriber affiliated from. And a menu supported in a segment and a segment group, which the subscriber is affiliated with, is read (S1220).

In the step (S1220), a menu (namely, a menu which can be displayed in the subscriber terminal) in accordance with apparatus information of the subscriber terminal of the read menus is filtered and then is transmitted to the mobile terminal (S1230, S1240).

At this time, in the case that any one of menus displayed in the mobile terminal is selected, icons corresponding to each item of the initial menu are searched (S1250).

Icons, except for an icon corresponding to the selected item of the icons corresponding to respective items of the initial menu, are displayed on an allotted area of the WAP page in the case that a low layer menu in accordance with the selected item is embodied in a WAP page (S1260).

Figure 13:
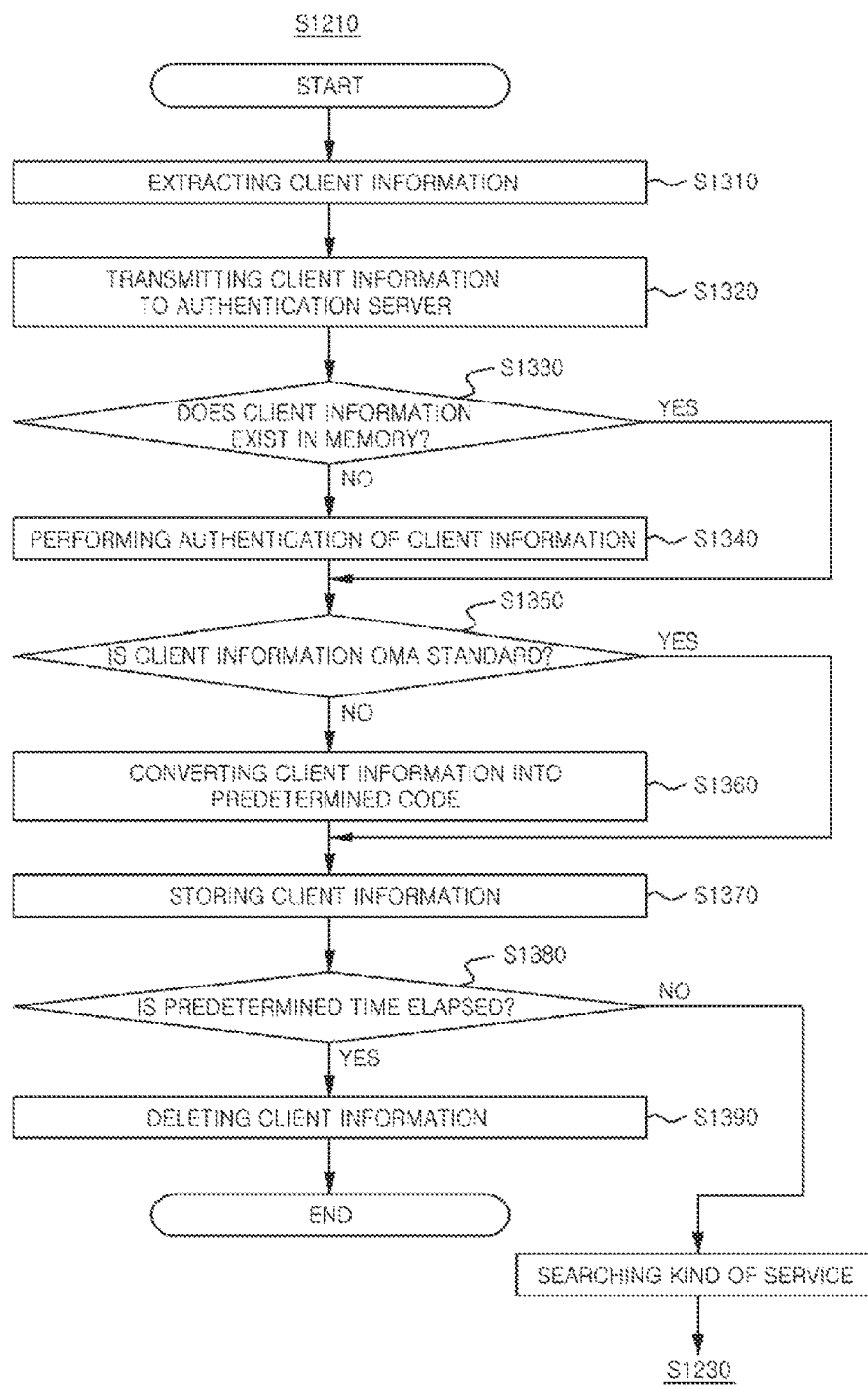

FIG. 13 is a flow chart illustrating a method for extracting subscriber information of the step (S1210) in FIG. 12.

The connection detection module 331 of the transmission unit 330 receives client information including subscriber information and apparatus information transmitted from a mobile terminal connected with the integrating and managing apparatus through the communication network 120, extracts subscriber information from the client information and then transmits the same to the authentication module 334 (S1310, 1320).

The authentication module 334 discriminates whether the client information is stored at a predetermined memory, and performs an authentication of the client information and storing then the authenticated client information at a predetermined memory in the case that the discriminating result doesn't satisfy the condition (S1330, S1340).

The authentication module 334 discriminates that a re-connection is performed by a user authenticated recently and enables the user to use a wireless internet without an authentication in the case that client information is stored at the memory. Accordingly, the client information automatically deleting in the case that a predetermined time is elapsed after the client information is stored (S1370, S1380, S1390).

In addition, the authentication module 334 discriminates whether the client information is not a form defined in an OMA standard (S1350).

The client information having a form defined in an OMA standard is a client ID, and the terminal information having a form defined in an OMA standard is a URI. A form defined in an OMA standard is formed as a predetermined code, and thus the subscriber information and the terminal information can be realized by only an equation decoding the code.

In conclusion, even though the subscriber information and the terminal information in itself following a form defined in an OMA standard are provided for the external contents providing terminal 150, a needless release of the client information is generated.

Accordingly, the client information exactly is stored in the case that the subscriber information and the terminal information follow a form defined in an OMA standard, and the client information is converted into a predetermined code and is stored at the memory in the case that the subscriber information and the terminal information don t follow a form defined in an OMA standard (S1360, S1370).

Figure 14:
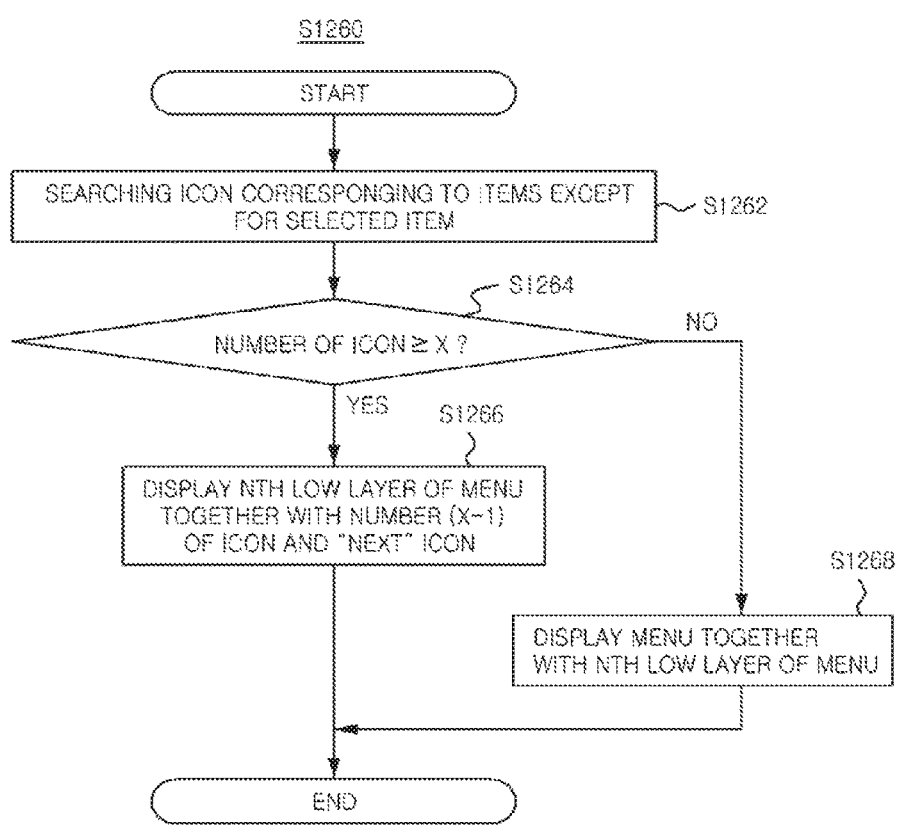

FIG. 14 is a flow chart for in detail explaining the step (S1260) in FIG. 12.

Icon corresponding to items except for items selected in the step (S1262) is searched (S1262). Items (namely, 1. a traffic item, 2. a travel item, 3. a stock item, 4. a bank item, 5. a shopping item, 7. a MSN item), except for the entertainment item (2550) are searched in the case that a specific item (2550) is selected.

The icon of icons are displayed in a predetermined position together with a low layer of a menu in the case that the number of the icon is under a predetermined number which can be displayed in an allotted area of a WAP page (S1264, S1268).

Herein, the number of the icon that can be displayed is differently adjusted in accordance with a screen size, namely, a size of LCD window.

Figure 26:
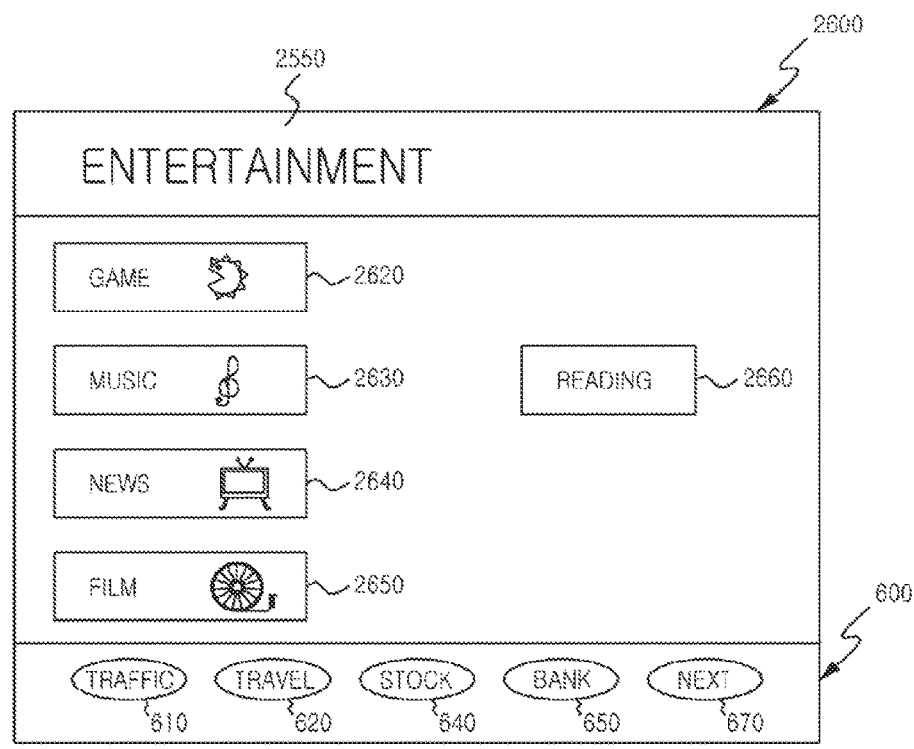

But in the case that the number of the icon is more than a predetermined number (X), only an icon, which has one less numbers (X−1) than the predetermined number and remaining mobile icons, is embodied in a predetermined position together with a next icon 670 as depicted in FIG. 26 and thus a move into icon, which can be displayed in a WAP page, can be embodied (S1266).

Figure 27:
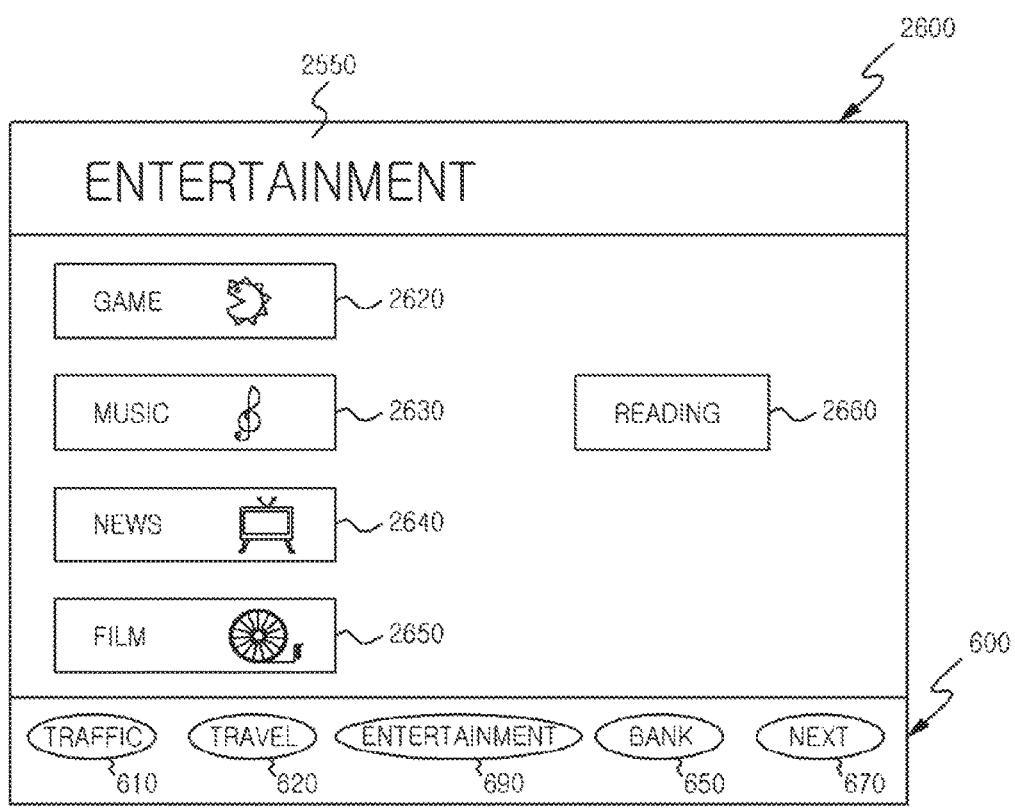

Preferably, as depicted in FIG. 27, a menu linked with items displayed on a screen of a mobile terminal at present is displayed together with icons corresponding to the initial menu. As an example, an icon 690 corresponding to an entertainment item can be displayed together with a traffic icon 610, a travel icon 620, a stock icon 640 and a next icon 670.

More preferably, the menu linked with items displayed on a screen of a mobile terminal at present is separately displayed so as to be different from the other items.

Figure 15:
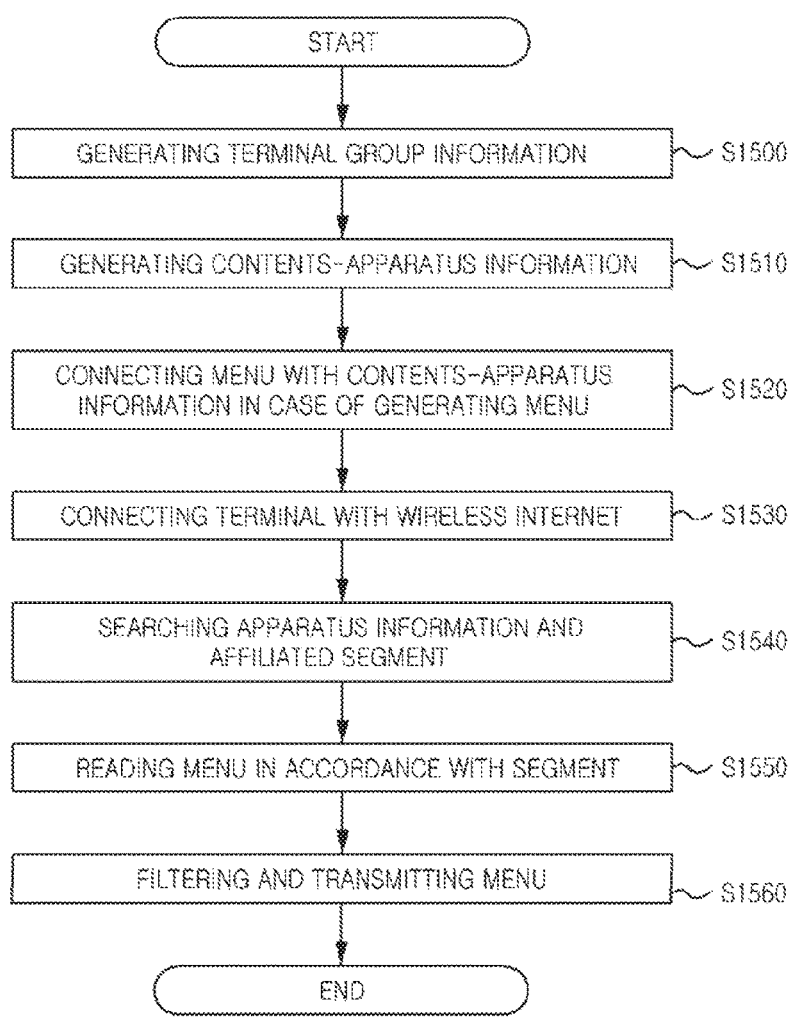

FIG. 15 is a flow chart illustrating a method for providing a menu according to apparatus information of a subscriber terminal in accordance with an embodiment of the present invention.

Terminal group information is generated by classifying apparatus information of the mobile terminal 100 in accordance with a predetermined rule (S1500). At this time.

The classification of the mobile terminal 100 in accordance with the predetermined rule is performed by a screen size of the mobile terminal, the number of a color supported from the mobile terminal, whether to be a mobile terminal having a camera or not, the number of a chord supported by sound of the mobile terminal and a memory built-in, etc, and can be modified by an operator.

Information of contents is registered through the contents management module 420 of the integrating and managing apparatus 200 in the case that a contents provider provides a service the mobile terminal 100 through the integrating and managing apparatus 200. Namely, a contents provider registers a URL (Uniform Resource Locater) on which the contents located together with a contents name or an ID. At this time, the contents provider also registers an option of a mobile terminal that the contents can be embodied.

Additionally speaking, contents-apparatus information of terminal group information generated in the step (S1500) is selected and then generated in case of registering the contents (S1510).

An operator generates a menu of a wireless internet to be provided for the mobile terminal 100 connected with the wireless internet. The menu comprises a directory menu with which a contents connection menu, which is position information, cannot be connected and a CP entry menu embodied so as to be connected with the contents connection menu.

A menu is provided in accordance with apparatus information by connecting a directory menu of the menus with the contents-apparatus information (S1520).

In the case that the mobile terminal 100 is connected with the integrating and managing apparatus 200, a connection detection module 331 of the integrating and managing apparatus 200 detects apparatus information and subscriber information (S1530).

The basic information collection module 332 discriminates what service was the subscriber affiliated from on the basis of subscriber information detected from the connection detection module 331 (S1540). Namely, the basic information collection module 332 discriminates what segment group does the subscriber belong to and what segment group was the subscriber affiliated from. And a menu supported in a segment and a segment group, which the subscriber is affiliated with, is read (S1550).

A rendering module 333 of the transmission unit 330 filters a menu matched with apparatus information detected from the connection detection module 331 of the menus read in step (S1550) and then transmits the same to the mobile terminal 100 (S1230, s1240).

Figure 16:
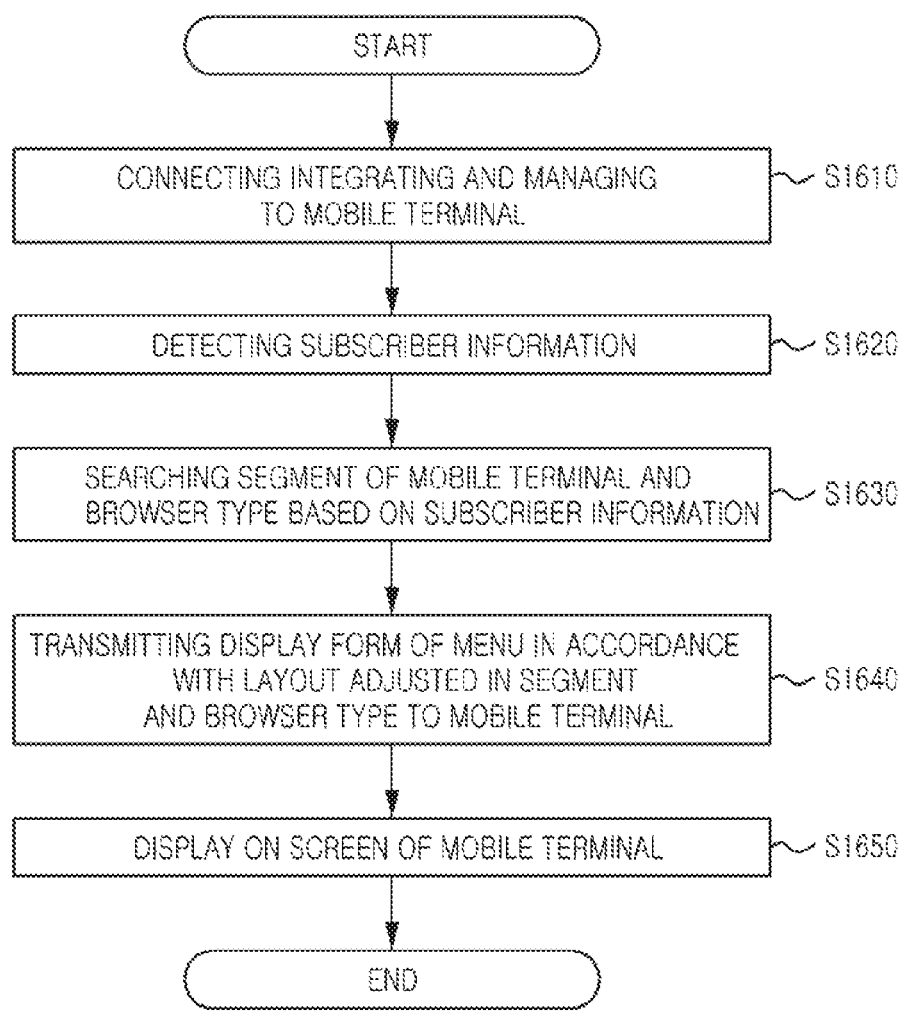

FIG. 16 is a flow chart illustrating a method for providing a menu having a predetermined view type for a mobile terminal connected with a wireless internet in accordance with an embodiment of the present invention.

The connection detection module 331 of the transmission unit 330 detects the subscriber information in the case that the mobile terminal connects with an integrating and managing apparatus 200 for managing an operation of a wireless internet (S1610, S1620).

With what segment is the mobile terminal affiliated and a browser type of the mobile terminal is searched (S1630). Namely, because menus provided for a mobile terminal from each segment is different from each other, a process for searching what segment is the mobile terminal affiliated with is requested.

In the case that a specific segment that the mobile terminal is affiliated with is detected, a layout adjusted in the segment and a menu provided from the segment are read.

A rendering module 333 of the transmission unit 330 reconstructs a menu provided from the segment based on the menu, a layout of the menu and a view type of the menu and then transmits the same to the mobile terminal 100. The transmitted menu is displayed on a screen of a mobile terminal (S1650).

The browser type includes a browser for a text (1.x) supporting a text and a browser for a multimedia (Next Generation Browser) supporting multimedia contents.

Figure 9:
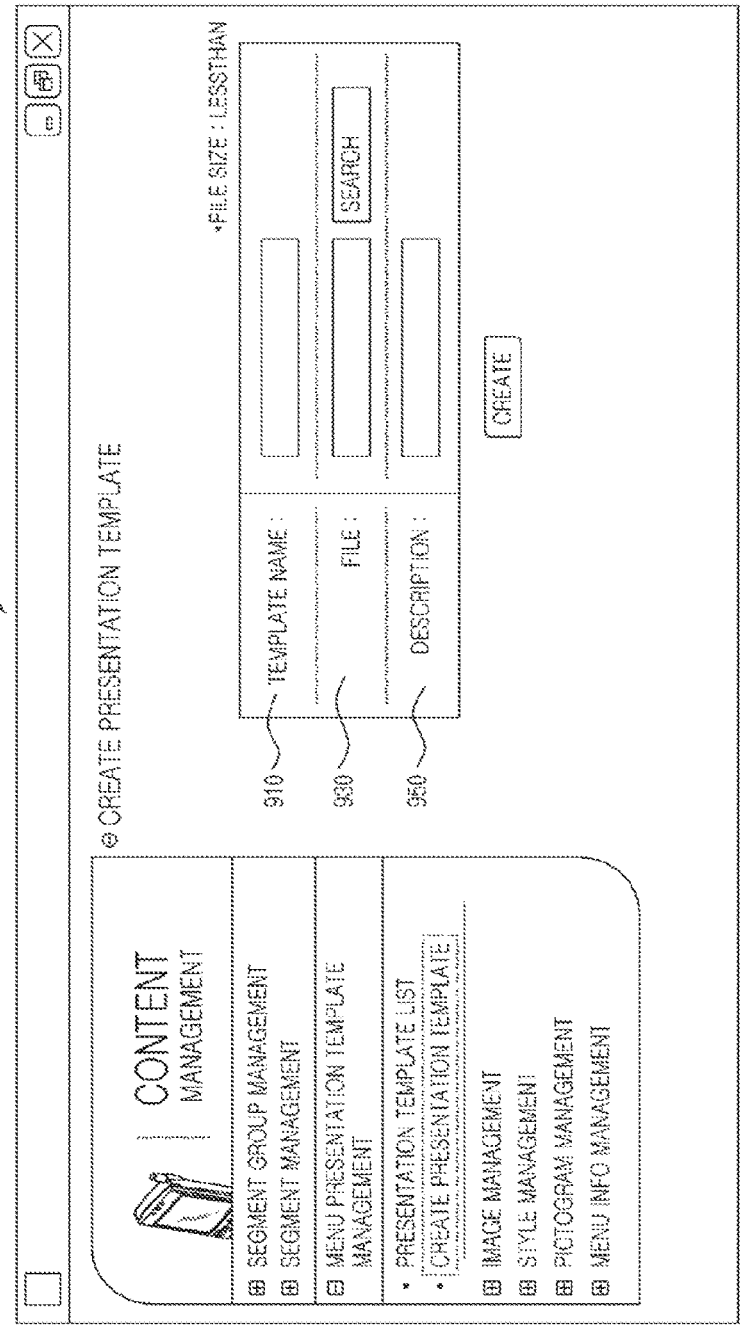
Figure 10:
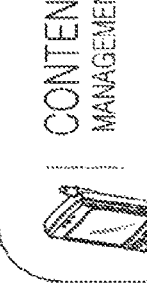

FIGS. 9 and 10 illustrate an interior block diagram of a web page for deciding a layout and a view type of a menu provided for a mobile terminal in accordance with an embodiment of the present invention, and FIGS. 19 through 24 illustrate an exemplary menu provided for a mobile terminal in accordance with an embodiment of the present invention Referring to a web page depicted in FIG. 9, a layout of a menu provided by an operator of menus displayed in a mobile terminal is decided. The layout of a menu is differently adjusted in accordance with each low layout provided by the operator.

A main menu provided by an operator is displayed in a mobile terminal as a layout depicted in FIG. 19 in the case that the mobile terminal connects with an integrating and managing apparatus 200 for managing an operation of a wireless internet. At this time, a menu is displayed in a mobile terminal as a layout depicted in FIG. 20 in the case that a game item is selected. In addition, a menu is displayed in a mobile terminal as a layout depicted in FIG. 24 in the case that a music item is selected in FIG. 19

For the convenience of an explanation of the present invention, a layout, which respective items are arranged with an icon form as depicted in FIG. 19, will be named as a first template, a layout, which a menu is formed in a left side of a screen and a low menu of a menu selected in a right side of the screen or a content thereof is arranged as a layout depicted in FIG. 20, will be named as a second template, a layout arranged as a sheet form as depicted in FIG. 24 will be named as a third template.

The first and the third template is stored as a predetermined file. An operator inputs a layout name (namely, a template name; 910) of a menu in a web page of FIG. 9, designates a template file 930 to be selected and inputs a simple explanation of the layout.

Referring to FIG. 10, the method how a view type of a menu is adjusted can is realized. Specifically speaking, a view type of a menu title is adjusted through a selection window 1010 in a web page of FIG. 10.

Accordingly, various view types such as an image title like a selection window 1900 in a web page of FIG. 19, a type title displaying a menu path like a selection window 2000 in a web page of FIG. 19 and icon title like a selection window 1310 in a web page of FIG. 23, etc are embodied.

In addition, a type method of a menu item in accordance with a browser is adjusted through a web page of FIG. 10. A reference numeral 1030 is an item adjusting a view type in the case that a browser of a mobile terminal is a browser for text. A view type supported in case of being a browser for text includes a text, an index and an index under bar. etc.

In addition, a reference numeral 1040 is an item adjusting a view type in the case that a browser of a mobile terminal is a browser for supporting a multimedia contents. A view type in accordance with the item includes a text, an index, an index under bar and a pictogram, etc.

And a type of an icon displayed in a menu is adjusted by a reference numeral 1060.

Furthermore, a character font can be adjusted and a character of total menu is identically adjusted in accordance with a position displayed in the menu. A character font can be differently adjusted in accordance with a character position (namely, whether the character is located on a high end or whether the character is located on a low end, and whether the character is for a text) displayed in the menu (see a reference numeral 1070 in FIG. 10).

Figure 17:
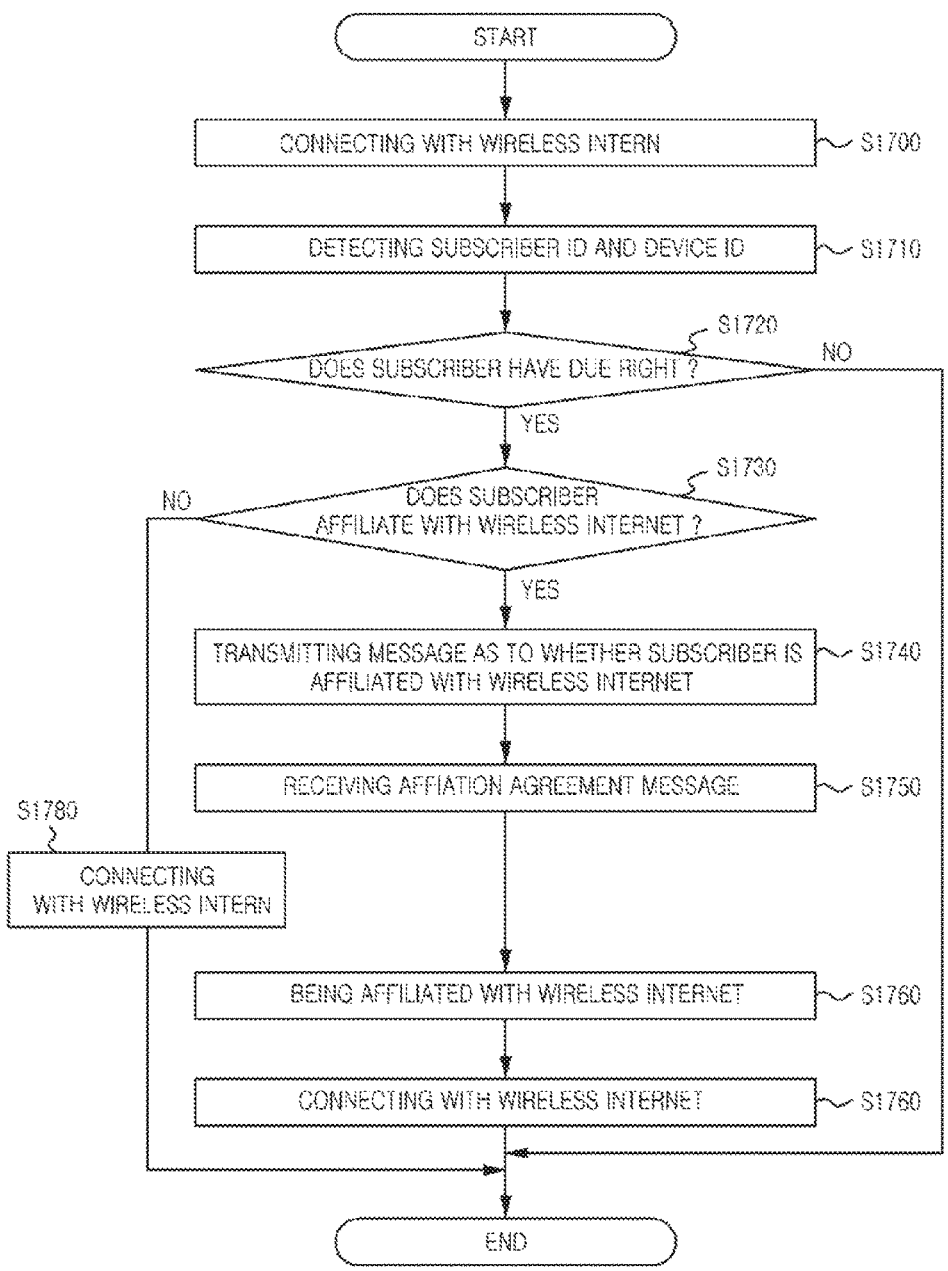

FIG. 17 suggests a process enabling a client to automatically being affiliated with a wireless internet in the case that the client is a subscriber of a mobile communication network or a wire network but is not affiliated with the wireless internet.

The transmission unit 300 of the integrating and managing apparatus 200, which a portal platform for managing an operation of a wireless internet and a wire internet, detects subscriber information and apparatus information of the subscriber terminal 100 in the case that a subscriber terminal 100 accesses a wireless internet (S1700, S1710).

Particularly explaining, the connection detection module 331 of the transmission unit 330 detects subscriber information and apparatus information of the subscriber terminal 100. At this time, the subscriber information includes an MIN, an MDN and client information, and the apparatus information is a phone type or a URI.

After the connection detection module 331 detects the subscriber information, the authentication module 334 of the transmission unit 330 performs an authentication for discriminating whether the subscriber has a due right or not (S1720).

An operator or a manager decides a standard for discriminating whether the subscriber has a due right or not. Namely, as one example, a subscriber having a due right in accordance with the present invention is one who was affiliated with a mobile communication network service and the subscriber by who a billing of last service fee was normally processed.

In the step (S1720), whether the subscriber is registered to a wireless internet is inquired to the subscriber management unit 500 in the case that the subscriber of a mobile terminal 100 connected with a wireless network is a due subscriber (S1730).

The subscriber terminal is accessed to a wireless internet in the case that the subscriber registered to a wireless internet in the step (S1730).

A WAP page including an inquiry message as to whether to be affiliated with a wireless internet is transmitted to the subscriber terminal 100 in the case that the subscriber terminal 100 is not registered to a wireless internet according to a searching result using the WAP management module of the subscriber management unit 500 (S1750).

The subscriber terminal 100 transmits an agreement message of an affiliation with a wireless internet to the subscriber management unit 500 in the case that a user of the subscriber terminal 100 selects an identification icon 410 in the WAP page (S1760).

The subscriber management unit 500 approves an affiliation with a wireless internet using subscriber information and apparatus information detected from the connection detection module 331 of the transmission unit 330 and transmits the subscriber information and the apparatus information to the WAP subscriber management module in the case that a terminal of the subscriber receives an agreement message of an affiliation with a wireless internet (S1770).

A user ID, a password in accordance the user ID, terminal information, a social security number, an address and a real name, etc are an example of registration information basically requested in case of being affiliated with a wireless internet. However, only subscriber information and apparatus information are inputted as registration information through the above explanation, and the subscriber is registered by filling the other pieces of information with a provisional data in the subscriber management unit 500.

Figure 18:
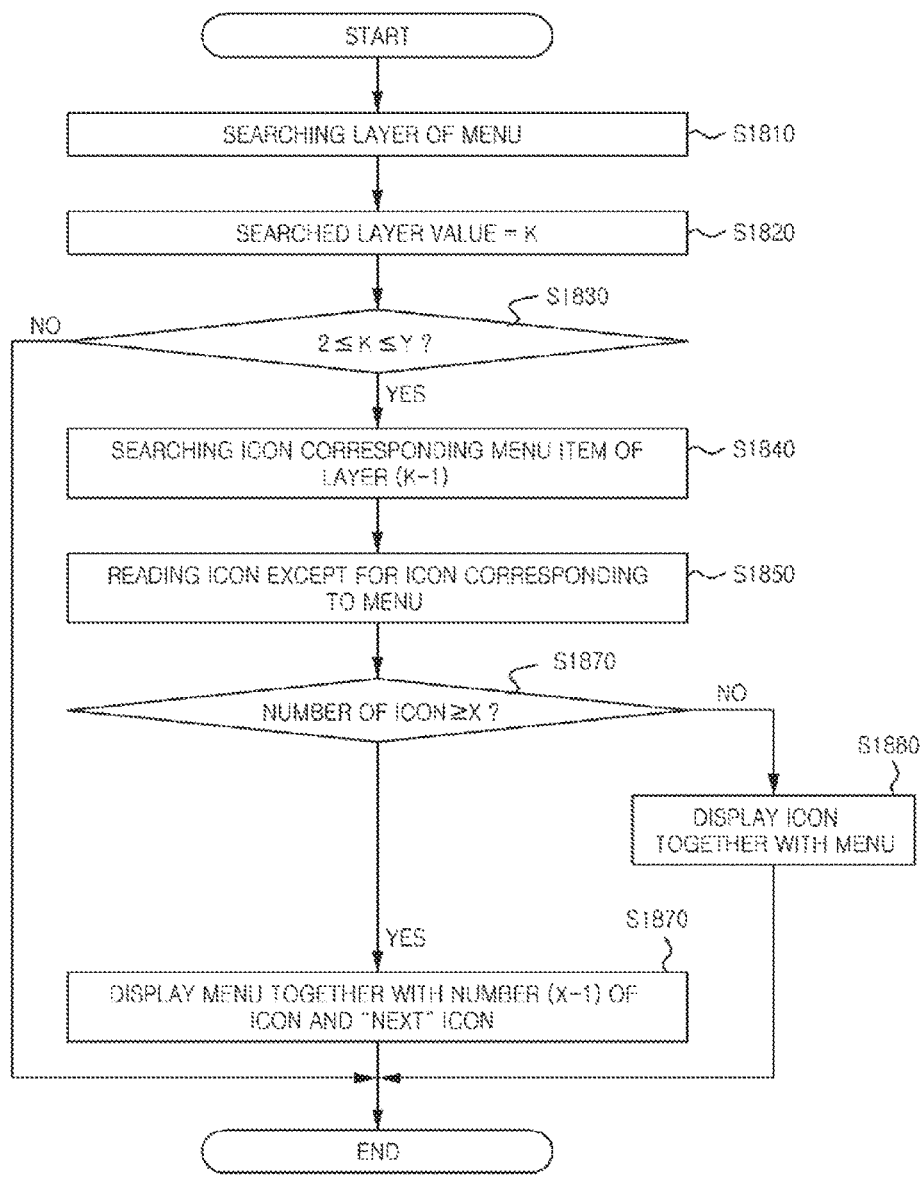

FIG. 18 is a flow chart illustrating a composition method of a menu provided for a mobile terminal in accordance with an embodiment of the present invention A layer of a menu is searched in the case that the menu is transmitted to a mobile terminal connected with a wireless internet (S1810).

A layer value of the searched menu is adjusted as "X" (S1820). Whether the a layer value (K) of the searched menu is more than a second layer and belongs to a last layer (Y) provided by an operator is discriminated (S1830). At this time, a layer value provided by the operator is adjusted as "Y".

$$2 \leq K \leq Y \qquad \text{[Equation 1]}$$

Icons corresponding to menu items of a high layer are searched in the case that a layer value of the searched menu satisfies the equation 1 (S1840).

How many icons exist is discriminated by reading icons except for an icon linked with the menu of menu items of the high layer (S1850).

All icons are embodied in a predetermined position in the case that the number of the icon is under a predetermined number (X) (S1880). Namely, all icons are displayed in a low end in the case that the number of the icon is under a predetermined number (X).

But an icon (X−1) number and a next icon are embodied in view of the space constraints for embodying all icons in a predetermined position of the WAP page in the case that the number of the icon is more than a predetermined number (X) (S1870).

In the case that the menu is a last layer provided by an operator (namely, K=Y), even though any one of a item of the menu is selected, an icon search corresponding to items except for the selected item is not performed.

In addition, it is preferable that a menu linked with items displayed on a screen of a present mobile terminal is displayed together with icons corresponding to the most significant menu.

It is more preferable that a menu is distinctively displayed unlike another icons for displaying the menu linked with items displayed on a screen of a present mobile terminal.

While the invention is susceptible to various modifications and alternative forms, specific embodiments thereof have been shown by way of example in the drawings and are herein description in detail. It should be understood, however, that the description herein of specific embodiments is not intended to limit the invention to the particular forms disclosed, but on the contrary, the invention is to include all modifications, equivalents and alternatives falling within the spirit and scope of the invention as defined by the appended claims.

INDUSTRIAL APPLICABILITY

The present invention provides a user with a content in accordance with an efficiency of a mobile terminal in a mobile communication providing a wireless internet service.

The invention claimed is:

1. A method for an integrating and managing apparatus to manage contents in a mobile communication system, the method comprising:
   receiving, from a content providing apparatus, an inquiry request corresponding to a service offered by the content providing apparatus;
   responding to an inquiry request related to a service provision using the content providing apparatus connected through a communication network; and
   managing contents provided from the content providing apparatus to a subscriber terminal according to the service by:
      obtaining apparatus information of the subscriber terminal;
      obtaining user information corresponding to a user associated with the subscriber terminal;
      authenticating the user information;
      automatically registering the subscriber terminal with a wireless internet service when authenticating the user determines the user is affiliated with a communication network associated with the wireless internet service according to a searched registered subscriber service;
      generating a service menu based on the apparatus information and the contents provided from the content providing apparatus to the subscriber terminal according to the service;
      transmitting, to the subscriber terminal, the service menu, wherein the subscriber terminal is configured to display the service menu.

2. The method of claim 1, wherein generating the service menu comprises:
   including a history menu of the subscriber terminal, the history menu comprising a previously selected menu by the subscriber terminal; and
   filtering the service menu to include menu items associated with the apparatus information.

3. The method of claim 1, wherein the user information includes at least a telephone identification number, and the apparatus information includes at least one of a phone type or a Unique Resource Identifier (URI).

4. The method of claim 1, further comprising:
receiving, from the wireless internet service, a request for personally identifiable information; and
transmitting, to the wireless internet service, at least one of a predetermined provisional data, the authenticated user information, or the apparatus information in response to the request for personally identifiable information.

5. The method of claim 1, further comprising:
encrypting the user information into a predetermined format when the user information is determined not to be in a format approved by an Open Mobile Appliance (OMA) standard; and
encrypting the apparatus information into the predetermined format when the apparatus information is determined not to be in a format approved by the OMA standard.

6. The method of claim 1, further comprising:
generating terminal group information by classifying the apparatus information in accordance with a predetermined rule;
generating contents-apparatus information when contents to be provided from the content providing apparatus to the subscriber terminal according to the service is stored on the integrating and managing apparatus;
connecting contents-apparatus information with a menu item included in the service menu; and
storing the connected contents-apparatus information when generating the service menu by connecting contents with corresponding terminal group information.

7. The method of claim 6, further comprising:
adjusting a layout of a segment within the service menu based on a received user adjustment command; and
transmitting, to the subscriber terminal, an adjusted service menu including the adjusted layout of the segment.

8. The method of claim 7, wherein adjusting the layout of the segment comprises adjusting at least one of a view type or a position of a menu item.

9. The method of claim 6, further comprising:
adjusting a layout of a segment within the service menu based on the apparatus information; and
transmitting, to the subscriber terminal, an adjusted service menu including the adjusted layout of the segment.

10. The method of claim 7, wherein adjusting the layout of the segment comprises adjusting a size of a menu item based on the apparatus information including a screen size of the subscriber terminal.

11. A non-transitory machine-readable medium storing instructions that, when executed by a processor, cause the processor to:
receive, from a content providing apparatus, an inquiry request corresponding to a service offered by the content providing apparatus;
respond to an inquiry request related to a service provision using the content providing apparatus connected through a communication network; and
manage contents provided from the content providing apparatus to a subscriber terminal according to the service by:
obtaining apparatus information of the subscriber terminal;
obtaining user information corresponding to a user associated with the subscriber terminal;
authenticating the user information;
automatically registering the subscriber terminal with a wireless internet service when authenticating the user determines the user is affiliated with a communication network associated with the wireless internet service according to a searched registered subscriber service;
generating a service menu based on the apparatus information and the contents provided from the content providing apparatus to the subscriber terminal according to the service;
transmitting, to the subscriber terminal, the service menu, wherein the subscriber terminal is configured to display the service menu.

12. The non-transitory machine-readable medium of claim 11, wherein generating the service menu comprises:
including a history menu of the subscriber terminal, the history menu comprising a previously selected menu by the subscriber terminal; and
filtering the service menu to include menu items associated with the apparatus information.

13. The non-transitory machine-readable medium of claim 11, wherein the user information includes at least a telephone identification number, and the apparatus information includes at least one of a phone type or a Unique Resource Identifier (URI).

14. The non-transitory machine-readable medium of claim 11, further storing instructions that, when executed by a processor, cause the processor to manage the contents provided from the content providing apparatus to the subscriber terminal according to the service by:
receiving, from the wireless internet service, a request for personally identifiable information; and
transmitting, to the wireless internet service, at least one of a predetermined provisional data, the authenticated user information, or the apparatus information in response to the request for personally identifiable information.

15. The non-transitory machine-readable medium of claim 11, further storing instructions that, when executed by a processor, cause the processor to manage the contents provided from the content providing apparatus to the subscriber terminal according to the service by:
encrypting the user information into a predetermined format when the user information is determined not to be in a format approved by an Open Mobile Appliance (OMA) standard; and
encrypting the apparatus information into the predetermined format when the apparatus information is determined not to be in a format approved by the OMA standard.

16. The non-transitory machine-readable medium of claim 11, further storing instructions that, when executed by a processor, cause the processor to manage the contents provided from the content providing apparatus to the subscriber terminal according to the service by:
generating terminal group information by classifying the apparatus information in accordance with a predetermined rule;
generating contents-apparatus information when contents to be provided from the content providing apparatus to the subscriber terminal according to the service is stored on the integrating and managing apparatus;
connecting contents-apparatus information with a menu item included in the service menu; and
storing the connected contents-apparatus information when generating the service menu by connecting contents with corresponding terminal group information.

17. The non-transitory machine-readable medium of claim 16, further storing instructions that, when executed by a processor, cause the processor to manage the contents provided from the content providing apparatus to the subscriber terminal according to the service by:

adjusting a layout of a segment within the service menu based on a received user adjustment command; and transmitting, to the subscriber terminal, an adjusted service menu including the adjusted layout of the segment.

18. The non-transitory machine-readable medium of claim 17, wherein adjusting the layout of the segment comprises adjusting at least one of a view type or a position of a menu item.

19. The non-transitory machine-readable medium of claim 16, further storing instructions that, when executed by a processor, cause the processor to manage the contents provided from the content providing apparatus to the subscriber terminal according to the service by:

adjusting a layout of a segment within the service menu based on the apparatus information; and transmitting, to the subscriber terminal, an adjusted service menu including the adjusted layout of the segment.

20. The non-transitory machine-readable medium of claim 17, wherein adjusting the layout of the segment comprises adjusting a size of a menu item based on the apparatus information including a screen size of the subscriber terminal.

\* \* \* \* \*